(12) United States Patent
Ito

(10) Patent No.: US 7,610,301 B2
(45) Date of Patent: Oct. 27, 2009

(54) PROGRAM INFORMATION PROCESSING SYSTEM, PROGRAM INFORMATION MANAGEMENT SERVER, PROGRAM INFORMATION OPERATION TERMINAL, AND COMPUTER PROGRAM

(75) Inventor: Akihiko Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 11/134,393

(22) Filed: May 23, 2005

(65) Prior Publication Data

US 2005/0278336 A1 Dec. 15, 2005

(30) Foreign Application Priority Data

Jun. 14, 2004 (JP) .............................. 2004-176095

(51) Int. Cl.
*G06F 17/30* (2006.01)
(52) U.S. Cl. ......................... 707/102; 707/10; 707/201
(58) Field of Classification Search .................. 707/9, 707/3, 10, 102, 201, 202; 725/9, 25, 38, 725/39, 43, 53, 55; 726/2; 348/563
See application file for complete search history.

(56) References Cited

U.S. PATENT DOCUMENTS

| | | | | |
|---|---|---|---|---|
| 5,629,733 A | * | 5/1997 | Youman et al. ................ 725/53 |
| 5,686,954 A | * | 11/1997 | Yoshinobu et al. ............ 725/43 |
| 5,822,123 A | * | 10/1998 | Davis et al. .................... 725/43 |
| 6,486,920 B2 | * | 11/2002 | Arai et al. ..................... 348/563 |
| 7,100,195 B1 | * | 8/2006 | Underwood ................... 726/2 |
| 2002/0157096 A1 | | 10/2002 | Hane et al. |
| 2004/0083490 A1 | | 4/2004 | Hane |

FOREIGN PATENT DOCUMENTS

| | | |
|---|---|---|
| JP | 2000-4272 | 1/2000 |
| JP | 2003-101895 | 4/2003 |
| WO | WO 01/15449 A1 | 3/2001 |

* cited by examiner

*Primary Examiner*—Shahid A Alam
(74) *Attorney, Agent, or Firm*—Oblon, Spivak, McClelland, Maier & Neustadt, L.L.P.

(57) ABSTRACT

It is aimed at providing a program list that helps the audience to easily find an intended program. A program information management server creates a program list. The program information management server is provided with a user information storage section, a program meta information storage section, a program recommendation section, and a program list information creation section. The user information storage section stores user's preference information. The program meta information storage section stores meta information concerning a program. The program recommendation section references the program meta information storage section and retrieves a program recommended for the user based on the user's preference information. The program list information creation section 146 creates program list information containing, by preference, programs retrieved by the program recommendation section.

10 Claims, 17 Drawing Sheets

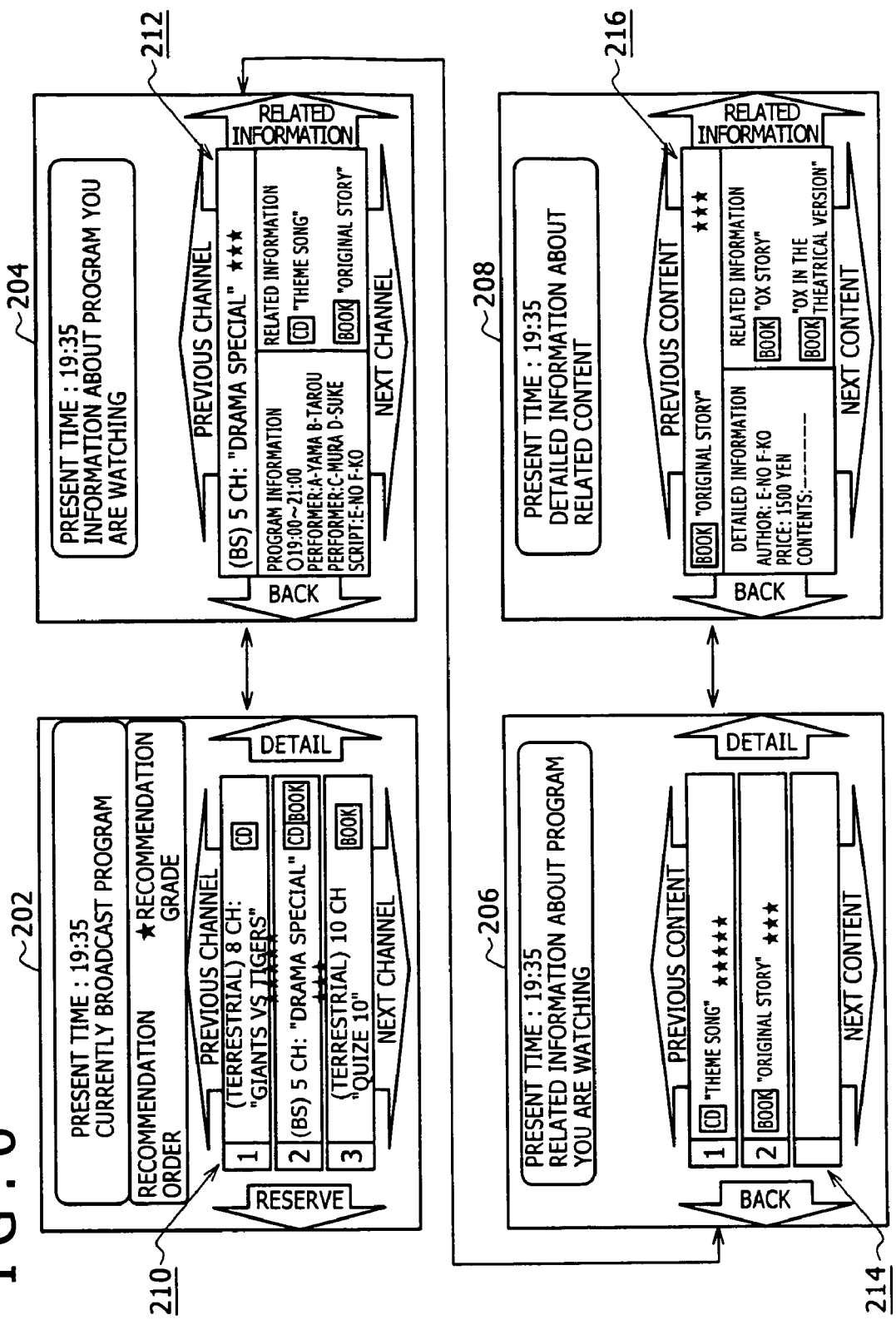

FIG. 12

```xml
<ProgramInfomation Id="PRO_1">
  <ProgramLocation Id="PL1"Live="true"OnDemand="false">
    <ScheduleEvent Id=!SE1">
      <ServiceInformation Id="Service1" Platform="CS_110" ServiceId="312">
        <ServiceGenre Id="SG1" Genre="DRAMA/MYSTERY">    432
      </ServiceInformation>
      <EventDescription Id="ED1"OnAirDate="2004-01-30"PublishedTime="19:00:00.000"    434
                        PublishedDuration="PT02H30M00S"/>
    </ScheduleEvent>
  </ProgramLocation>

<BasicDescription Id="BD1"Title="ABC DETECTIVE 3"
   Keyword="ABC DETECTIVE 3 A-YAMA B-TARO C-MURA D-SUKE MYSTERY THRILLER OLD CASTLE MURDER GERMANY">
    <MaterialInformation Id="Material 1">    436                                        438
      <Synopsis Id="Synopsis 1"
       ContentCategory="PLOT"
       Detail="A CASE OCCURRED AT AN OLD CASTLE NEAR THE LAKE IN GERMANY.
       MYSTERY SERIES PART 3"/>
      <CreditsList Id="Clist1">
        <CreditsItem Id="CItem1" PersonName="A-YAMA B-TARO">
          <Character Id="Chara1"    440   Role="PERFORMER">
        </CreditsItem>
        <CreditsItem Id="CItem2" PersonName="C-MURA D-SUKE"
          <Character Id="Chara2"          Role="PERFORMER">
        </CreditsItem>
      </CreditsList>
    </MaterialInformation>
  </BasicDescription>
</ProgramInfomation>
```

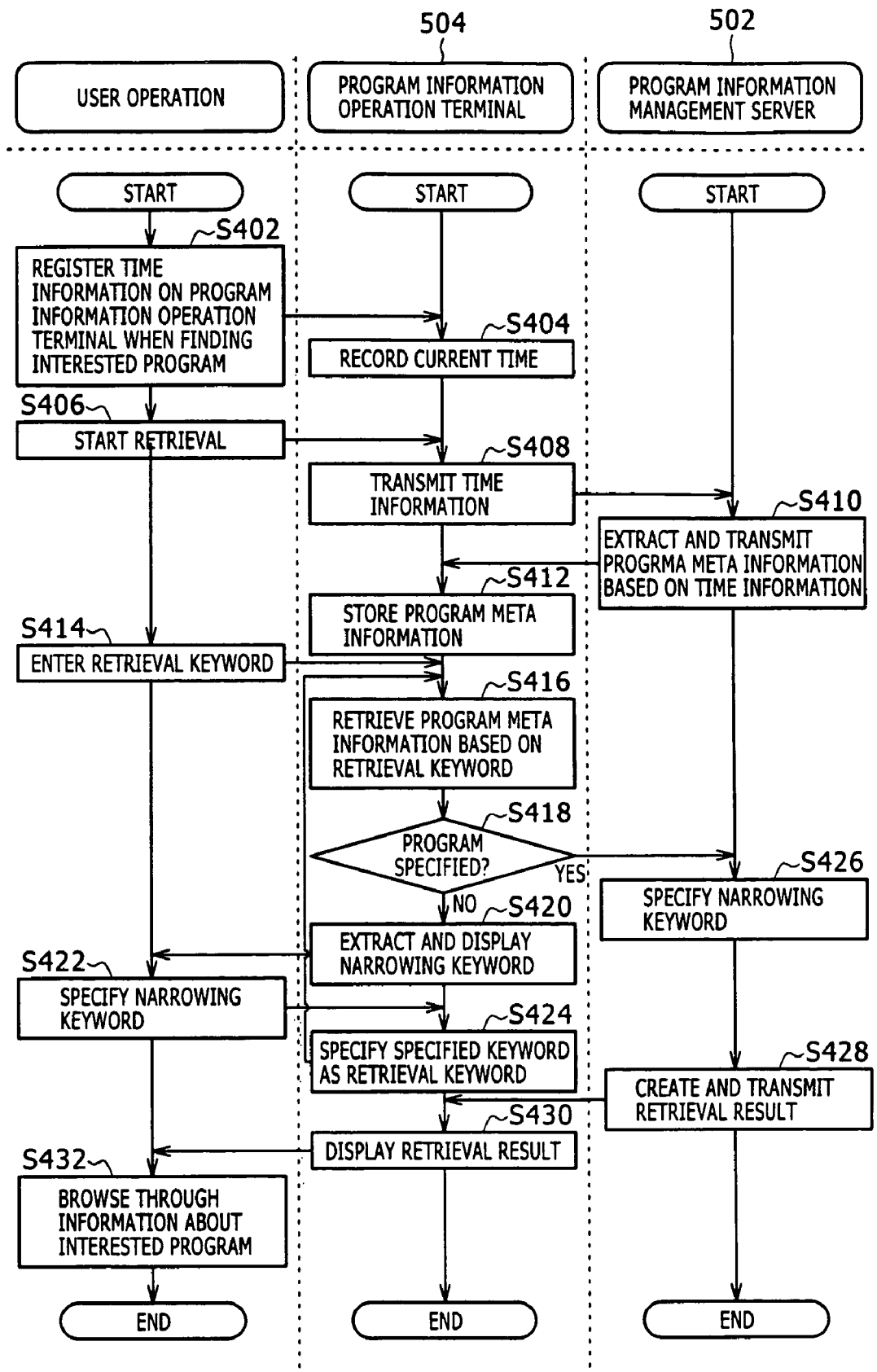

PROGRAM INFORMATION PROCESSING SYSTEM, PROGRAM INFORMATION MANAGEMENT SERVER, PROGRAM INFORMATION OPERATION TERMINAL, AND COMPUTER PROGRAM

CROSS REFERENCES TO RELATED APPLICATIONS

The present invention contains subject matter related to Japanese Patent Application JP 2004-176095 filed in the Japanese Patent Office on Jun. 14, 2004, the entire contents of which being incorporated herein by reference.

BACKGROUND OF THE INVENTION

1. Field of the Invention

The present invention relates to a program information processing system, a program information management server, a program information operation terminal, and a computer program.

2. Description of Related Art

There has been a broadcast system that provides the audience with not only broadcast programs, but also broadcast program tables composed of EPG information. The audience can search for interested programs by browsing a list of broadcast programs contained in a broadcast program table displayed on a display screen.

There may be a case where a user may be incapable of specifying a program he or she watched and later wanted to retrieve information about it. In consideration for such case, there is proposed the system that can provide the user with intended information by specifying the program (e.g., see JP-A No. 125914/2001). The above-mentioned system can specify an intended program using location information, broadcast station information, and program's broadcast time preregistered by the user.

SUMMARY OF THE INVENTION

In recent years, however, the ground wave analog/digital broadcast and the satellite analog/digital broadcast provide a dramatically increasing number of programs available for the audience. Since the same time slot is subject to an increasing number of available programs, the audience may have to browse through a huge number of programs when searching a program list as the broadcast program table for an interested program. It has been difficult to find an intended program.

The above-mentioned system allows a user to specify a program watched by the user and makes efficient program retrieval difficult when an intended program does not match the location information or the broadcast station information preregistered by the user. It has been difficult to locate an intended program.

The present invention has been made in consideration of the foregoing. There is a need for providing a program information processing system, a program information management server, a program information operation terminal, and a computer program capable of providing such a program list of broadcast programs as to easily finding intended programs for the audience.

There is another need for providing a program information processing system, a program information management server, a program information operation terminal, and a computer program capable of efficiently specifying an intended program the user is searching for.

To solve the above-mentioned problem, an embodiment of the present invention provides a program information processing system including a program information management server to store program meta information as meta information about a program and a program information operation terminal to allow a display apparatus to display a program list created based on the program meta information.

In the above-mentioned system, the program information management server has a program meta information storage section which stores a plurality of the program meta information associated with the programs, wherein the program meta information includes at least available time information showing availability of the program to a user; a user information storage section which stores a user identifier associated with the user's preference information, wherein the user identifier uniquely identifies a user of the program information operation terminal; a user identification reception section which receives the user identifier from the program information operation terminal; a time information reception section which receives time information from the program information operation terminal; a program recommendation section which retrieves a plurality of programs from the program meta information storage section, wherein the programs are made available at an approximate time indicated by the time information based on the time information, the user identifier, and preference information stored in the user information storage section associated with the user identifier and are recommended to a user identified by the user identifier; a program list information creation section which creates program list information based on program list information associated with each of a plurality of programs retrieved by the program recommendation section; and a program list information transmission section which transmits the program list information created by the program list information creation section to a program information operation terminal of a user identified by the user identifier.

In the above-mentioned system, the program information operation terminal has a user identifier transmission section which transmits the user identifier to the program information management server; a time information transmission section which transmits the time information to the program information management server; a program list information reception section which receives the program list information from the program information management server; and a program list display section which allows the display apparatus to display the program list based on the program list information.

The program available at the approximate time indicated by the above-mentioned time information signifies a program the user can watch at the time indicated by the time information. For example, such program includes a program to start broadcasting at the specified time and a program to start broadcasting approximately at the specified time and to be on the air at the time.

The above-mentioned invention makes it possible to create program list information according to user's preference. The reason follows. The program recommendation section of the program information management server retrieves program meta information from the program meta information storage section based on the user's preference information and the time information. Based on the retrieved program meta information, the program list information creation section creates program list information. The program information operation terminal uses a display apparatus to display a program list based on the program list information created according to the user's preference. Even when a user is searching for an interested program while browsing through the program list, the display apparatus displays a list of programs selected according to the user's preference. There is provided an advantage of easily finding interested programs.

To solve the above-mentioned problem, another embodiment of the present invention provides a program information management server which is connected to a program information operation terminal for displaying a list of programs on a display apparatus via a communication network and stores program meta information as meta information about the programs, the program information management server. The above-mentioned program information management server includes a program meta information storage section which stores the program meta information at least including available time information including at least available time information showing availability of the programs to a user; a user information storage section which stores a user identifier associated with the user's preference information, wherein the user identifier uniquely identifies a user of the program information operation terminal; a user identification reception section which receives the user identifier from the program information operation terminal; a time information reception section which receives time information from the program information operation terminal; a program recommendation section which retrieves a plurality of programs from the program meta information storage section, wherein the programs are made available at an approximate time indicated by the time information based on the time information, the user identifier, and preference information stored in the user information storage section associated with the user identifier and are recommended to a user identified by the user identifier; a program list information creation section which creates program list information based on program list information associated with each of a plurality of programs retrieved by the program recommendation section; and a program list information transmission section which transmits the program list information created by the program list information creation section to the program information operation terminal of a user identified by the user identifier.

The above-mentioned invention makes it possible to create program list information according to user's preference. The reason follows. The program recommendation section of the program information management server retrieves program meta information from the program meta information storage section based on the user's preference information and the time information. Based on the retrieved program meta information, the program list information creation section creates program list information.

The above-mentioned program information management server may further include a content meta information storage section which stores content meta information as meta information about a content related to the program in association with each program. The program list information creation section may include the content meta information in the program list information. This configuration can provide users with information about contents related to programs together with program list information.

The above-mentioned program recommendation section may calculate information indicating a recommendation order of programs. The program list information creation section may determine the amount of the program meta information about the programs and/or the content meta information to be included in the program list information in accordance with the recommendation order of programs. This configuration can provide a user with more information about such programs as having high recommendation orders and being recommendable for the user than information about the other programs. Even when there is a limited amount of information available to users, the users can be provided with information expected to be profitable to them in preference to the other information.

The above-mentioned user information storage section may store user's audience area information in association with a user identifier. Based on the user identifier and the audience area information, the above-mentioned program recommendation section may further retrieve programs available in an audience area for the user identified by the user identifier. The user's audience area information concerns an area where the user watches programs. Specifically, the user's audience area information provides information about the user's residence or the area predetermined by the user. Since the user information storage section can store the audience area information, the program list information creation section can be supplied with a retrieval result containing only programs available to the user's audience area. The reason follows. Depending on audience areas, programs broadcast in the same time slot may or may not be available to users. In such case, the program recommendation section can use the user's audience area information as a retrieval condition based on the user identifier received from the program information operation terminal. The audience area information may be contained in the program meta information. Alternatively, another storage section for storing an area in association with programs available to that area may be provided for the program information management server or another information processor communicable with the program information management server.

To solve the above-mentioned problem, still another embodiment of the present invention provides a program information operation terminal which is connected to a program information management server for storing program meta information as meta information about programs and allows a display apparatus to display a program list created based on the program meta information. The above-mentioned program information operation terminal includes a user identifier transmission section which transmits a user identifier to the program information management server, wherein the user identifier uniquely identifies a user of the program information operation terminal; a time information transmission section which transmits time information to the program information management server; a program list information reception section which receives program list information from the program information management server, wherein the program list information is created based on the user identifier and the time information transmitted; and a program list display section which allows the display apparatus to display the program list based on the program list information. The program list contains, by preference, programs which are made available at an approximate time indicated by the time information and are recommended to a user identified by the user identifier.

When the program list contains programs recommended to users by preference, it is meant that the program list contains only programs recommended to users. Alternatively, it is meant that the program list contains the recommended programs in preference to the other programs. This applies a case where there are many programs available at the approximate time indicated by the above-mentioned time information but the above-mentioned display apparatus limits the number of programs to be displayed in the program list at a time. According to the embodiment of the present invention, the program information operation terminal uses the program list information created based on the user identifier transmitted by the user identifier transmission section. The program information operation terminal allows the display apparatus to display a program list containing programs recommended to the user by preference. Even when a user is searching for an interested program while browsing through the program list, the display apparatus displays a list of programs selected according to the user's preference. There is provided an advantage of easily finding interested programs.

The program list information may contain recommendation information indicating a recommendation order of programs. The program list display section may allow the display apparatus to display a program list according to the recommendation order provided for a user based on the recommendation information. The recommendation information indicating the recommendation order may contain numerically represented recommendation grades supplied to users on the program basis or may contain recommendation ranks assigned to the programs. Since such configuration displays the program list according to the order of recommendations to the user, he or she can more easily find his or her interested programs from the program list.

The above-mentioned program information operation terminal may further include a program specification section which can connect with a program output apparatus for outputting program contents via a communication network and specifies a specific program out of the program list displayed on a display apparatus by the program list display section; and a program change section which transmits program change information to the program output apparatus so as to allow the program output apparatus to output a program content of a program specified by the program specification section. The program contents include video contents received from broadcast stations and output from television sets and audio contents output from radios. According to such configuration, the program list contains programs recommended to a user by preference. The user can select a program from the program list and switch to the program. The user can easily find his or her interested program from the program list and switch a program content output on the program output apparatus to the found program. Accordingly, the user can easily watch interested program contents.

The program list may include content guide information for guidance to a content related to the program. There may be further provided a content guide information storage section which stores the content guide information about a program selected from the program list. According to such configuration, the user can reference program-related contents based on the content guide information. The content guide information is stored in the content guide information storage section. Accordingly, the user can reference contents based on the stored content guide information when it is convenient for the user after watching the program, for example. Further, it is also possible to copy the stored content guide information to an information processor other that the program information operation terminal and reference the contents using that information processor. For example, there may be a case where the program information operation terminal may not be able to display or reproduce a content that can be referenced from the content guide information. In such case, when the content guide information is copied to an information processor capable of reproducing the content, the information processor can reproduce the content. The content guide information may provide meta information about the content showing its location or a program identifier uniquely identifying a program associated with the content.

The above-mentioned program list information may include the content guide information for guidance to a content related to the program. The above-mentioned program information operation terminal may include a content guide information transmission section which transmits content guide information to the program information management server; a related content reception section which receives a content guided by the content guide information from the program information management server; and a related content display section which displays the related content on the display apparatus. According to such configuration, the user can browse through program-related contents using the program information operation terminal. The content guide information may provide meta information about the content showing its location or a program identifier uniquely identifying a program associated with the content. When the content guide information is a program identifier, for example, the program information management server can transmit all contents associated with programs identified by program identifiers received from the program information operation terminal to the program information operation terminal.

To solve the above-mentioned problem, yet another embodiment of the present invention provides a computer program allowing a computer to function as the program information management server or the program information operation terminal as mentioned above.

To solve the above-mentioned problem, still yet another embodiment of the present invention provides a program information processing system for retrieving programs using the program meta information as meta information about programs. In the above-mentioned system, a communication network is used for connection between a program information management server to store the program meta information and a program information operation terminal to specify retrieval conditions. The program information management server includes a program meta information storage section which stores a plurality of the program meta information associated with the programs, wherein the program meta information includes at least available time information showing availability of the program to a user; a time information reception section which receives time information from the program information operation terminal; a retrieval keyword reception section which receives a retrieval keyword from the program information operation terminal; a program retrieval section which retrieves one or more programs from the program meta information storage section based on the time information and the retrieval keyword, wherein the programs are made available at an approximate time indicated by the time information and are associated with the program meta information containing the retrieval keyword; a narrowing keyword extraction section which extracts a narrowing keyword from a plurality of program meta information associated with a program retrieved by the program retrieval section; and a narrowing keyword transmission section which transmits a narrowing keyword extracted by the narrowing keyword extraction section to the program information operation terminal.

The program information operation terminal includes a time information transmission section which transmits the time information to the program information management server; a narrowing keyword reception section which receives the narrowing keyword from the program information management server; a narrowing keyword display section which displays the narrowing keyword on a display apparatus; and a retrieval keyword transmission section which transmits a narrowing keyword as a retrieval keyword to the program information management server, wherein the narrowing keyword is selected from those displayed on the display apparatus.

According to the embodiment of the present invention, the program information management server provides the program information operation terminal with narrowing keywords extracted from the program meta information. The program information operation terminal specifies one of the narrowing keywords as a retrieval keyword and transmits it to the program information management server. Based on the retrieval keyword, the program information management server re-retrieves programs. Since the retrieval keyword is extracted from the program meta information, a retrieval result is sure to exist. That is, it is possible to more accurately retrieve programs than a case where a user repeatedly specify any retrieval keywords until finding a program. As a result, the program information management server can efficiently specify user-intended programs using the time information and narrowing keywords.

To solve the above-mentioned problem, yet still another embodiment of the present invention provides a program information management server which is connected with a program information operation terminal for specifying retrieval conditions and stores program meta information used for program retrieval. The program information management server includes a program meta information storage section which stores a plurality of the program meta information associated with the programs, wherein the program meta information includes at least available time information showing availability of the program to a user; a time information reception section which receives time information from the program information operation terminal; a program retrieval section which retrieves a program from the program meta information storage section based on the received time information, wherein the program is made available at an approximate time indicated by the time information; a narrowing keyword extraction section which extracts a narrowing keyword from a plurality of program meta information associated with a program retrieved by the program retrieval section; and a narrowing keyword transmission section which transmits a narrowing keyword extracted by the narrowing keyword extraction section to the program information operation terminal.

The embodiment of the present invention can provide a user retrieving programs with narrowing keywords extracted from the program meta information about programs available at a specified approximate time. The user can be provided with information about the user-specified time scheduled to broadcast the intended program in the past or in the future. The user can efficiently retrieve the program based on that information.

The program information management server may further include a retrieval keyword reception section which receives a retrieval keyword from the program information operation terminal. The program retrieval section retrieves one or more programs from the program meta information storage section based on the time information and the retrieval keyword, wherein the programs are made available at an approximate time indicated by the time information and are associated with the program meta information containing the retrieval keyword. Such configuration can provide a user retrieving programs with narrowing keywords extracted from the program meta information about programs that can be provided at the specified approximate time and contain a use-specified retrieval keyword. Consequently, the user can be provided with the information about the program that was or is going to be broadcast at the user-specified time and is associated with the user-specified retrieval keyword.

To solve the above-mentioned problem, still yet another embodiment of the present invention provides a program information operation terminal which is connected with a program information management server to store program meta information used for program retrieval via a communication network. The program information operation terminal includes a time information transmission section which transmits time information to the program information management server; a retrieval meta information reception section which receives program meta information from the program information management server, wherein the program meta information is associated with a program made available at an approximate time indicated by the transmitted time information; a retrieval meta information storage section which stores the received program meta information; a narrowing keyword extraction section which extracts a narrowing keyword from the program meta information stored in the retrieval meta information storage section; and a narrowing keyword display section which displays the narrowing keyword on a display apparatus.

According to the embodiment of the present invention, the program information operation terminal can receive, from the program information management server, the meta information about the program that was or is going to be broadcast at the user-specified time. The program information operation terminal can extract a narrowing keyword from the received meta information and provide the user with the narrowing keyword.

The program information operation terminal may further include a retrieval keyword input section which is supplied with a retrieval keyword; and a program retrieval section which retrieves one or more programs from the retrieval meta information storage section based on a retrieval keyword input to the retrieval keyword input section, wherein the programs are associated with the program meta information containing the retrieval keyword. According to such configuration, the program information operation terminal retrieves programs based on the program meta information stored in the retrieval meta information storage section. Consequently, the program information operation terminal need not communicate with the program information management server each time a retrieval keyword is specified.

To solve the above-mentioned problem, yet still another embodiment of the present invention provides a computer program capable of functioning as the program information management server or the program information operation terminal.

As mentioned above, the embodiments of the present invention can provide the program information processing system, the program information management server, the program information operation terminal, and the computer program capable of providing such a program list of broadcast programs as to easily finding intended programs for the audience.

Further, the embodiments of the present invention can provide the program information processing system, the program information management server, the program information operation terminal, and the computer program capable of efficiently specifying an intended program the user is searching for.

BRIEF DESCRIPTION OF THE DRAWINGS

FIG. 6 is an explanatory diagram showing screen layouts displayed on a program information operation terminal according to the first embodiment of the present invention;

FIG. 12 is an explanatory diagram showing part of program meta information according to the second embodiment of the present invention;

FIG. 15 is a timing chart showing a program information process according to the modification of the second embodiment of the present invention.

DETAILED DESCRIPTION OF THE PREFERRED EMBODIMENTS

Figure 1:
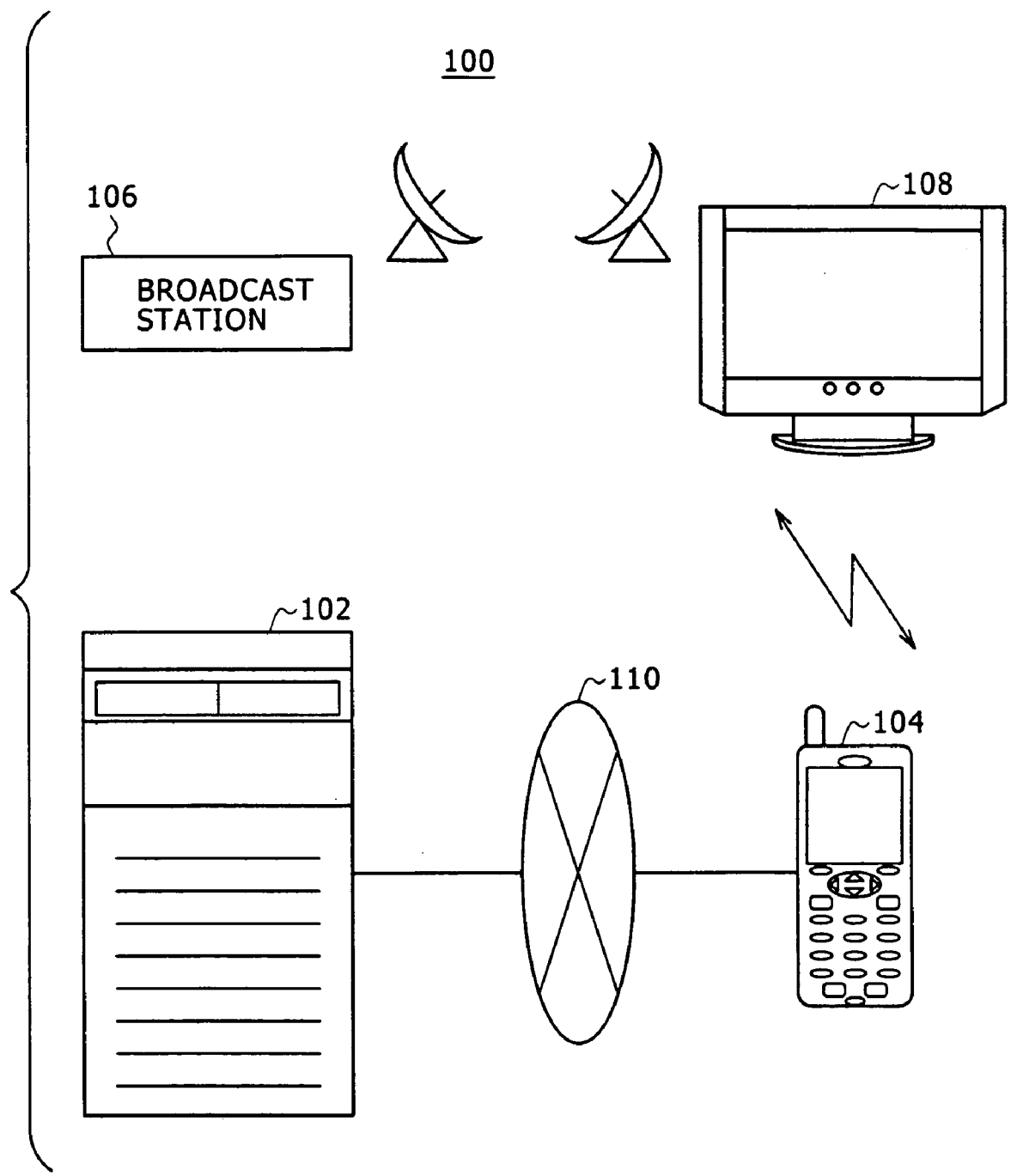
FIG. 1 is an explanatory diagram showing the overall configuration of a program information processing system according to a first embodiment of the present invention.

Preferred embodiments of the present invention will be described in further detail with reference to the accompanying drawings. Throughout the specification and the drawing, the components having substantially the same function configuration are depicted by the same reference numerals and a duplicate description is omitted for simplicity.

First Embodiment

As a first embodiment of the present invention, the program information processing system is applied to a program information processing system 100 having a program information management server 102 and a program information operation terminal 104. The program information management server 102 stores program meta information, i.e., meta information about programs. The program information operation terminal 104 allows a display apparatus to display a program list of broadcast programs created based on the program meta information.

Referring now to FIG. 1, the following describes the overall configuration of the program information processing system 100. For example, the program information processing system 100 has the program information management server 102, the program information operation terminal 104, and a communication network 110. The program information processing system 100 may further include a program output apparatus 108 and a broadcast station 106 that delivers programs to the program output apparatus 108.

The program information management server 102 is an information processor having a function to store program meta information, i.e., meta information about programs. The program meta information at least contains information about the time at which the program becomes available to users. Specifically, for example, the time to start broadcasting the program content and a period to broadcast it can be used to represent the time at which the program becomes available to users. The program meta information further includes, for example, channel information about the channel to broadcast the program, program genre information, cast information, script writer information, and keyword information to characterize the program content. The program contents may include audiovisual contents or only audio contents.

The program information operation terminal 104 is an information processor having a function to allow a display apparatus to display a program list created based on the program meta information. The program information operation terminal 104 further has a function to remote control the program output apparatus 108. Specifically, for example, the program information operation terminal 104 can make infrared communication with the program output apparatus 108 and command it to change contents to be output. The program information operation terminal 104 can be exemplified by a remote controller having the above-mentioned functions, portable terminals such as a cellular phone and a PDA (Personal Digital Assistant), and a PC (Personal Computer).

The program output apparatus 108 is an information processor having a function to output program contents delivered from the broadcast station 106. Specifically, the program output apparatus 108 is exemplified by a television set and a PC having the television function. The program output apparatus 108 may be exemplified by a radio receiver when the program content is composed of only audio. The program output apparatus 108 receives and outputs program contents including not only those provided by the ground wave analog/digital broadcast and the satellite analog/digital broadcast, but also those provided by the cable television broadcast.

The communication network 110 is a communication line network that connects the program information management server 102 and the program information operation terminal 104 in a bidirectionally communicable state. The communication network 110 may be wired or wireless and is exemplified by public line networks including the Internet, telephone line networks, and satellite communication networks, and leased line networks including WAN, LAN, and IP-VPN.

Figure 2:
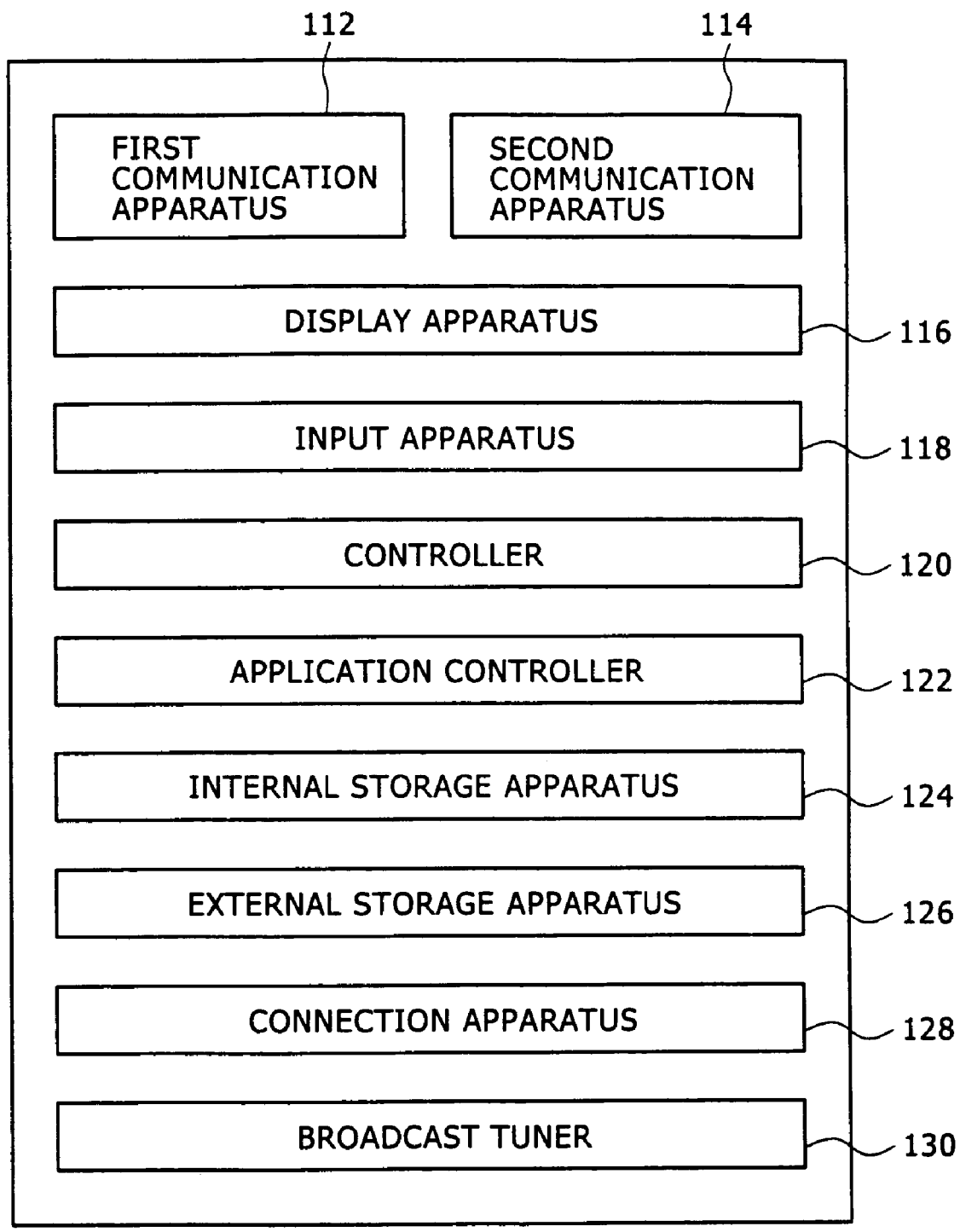
FIG. 2 is a block diagram showing the hardware configuration of a program information operation terminal according to the first embodiment of the present invention.

There has been described the overall configuration of the program information processing system 100. With reference to FIG. 2, the hardware configuration of the program information operation terminal 104 will now be described.

As shown in FIG. 2, for example, the program information operation terminal 104 has a first communication apparatus 112, a second communication apparatus 114, a display apparatus 116, an input apparatus 118, a controller 120, an application controller 122, an internal storage apparatus 124, an external storage apparatus 126, a connection apparatus 128, and a broadcast tuner 130.

The first communication apparatus 112 is exemplified by an antenna to receive radio waves from the broadcast station 106. The second communication apparatus 114 is a communication apparatus for communication with the program information management server 102 and the program output apparatus 108. The display apparatus 116 is used to display a program list (to be described) and is exemplified by a liquid crystal display. The input apparatus 118 is a user interface to receive information from users and is exemplified by a button, a lever, and a switch. The controller 120 is exemplified by a CPU having a function to provide overall control over the program information operation terminal 104. The application controller 122 has a function to control applications and is exemplified by JAVA, HTML, and BML engines. The internal storage apparatus 124 is contained in the program information operation terminal 104 and is exemplified by a scratch pad, an IC chip, ROM, and RAM. The external storage apparatus 126 is attachable to or detachable from the program information operation terminal 104 and is exemplified by a memory card. The connection apparatus 128 is used to connect the program information operation terminal 104 to the other information processors and the like and is exemplified by a USB connector. The broadcast tuner 130 is used to receive program contents from the broadcast station 106. The first communication section 112 and the broadcast tuner 130 enable the program information operation terminal 104 to receive program contents from the broadcast station 106. The first communication section 112 and the broadcast tuner 130 may not be provided.

Figure 3:
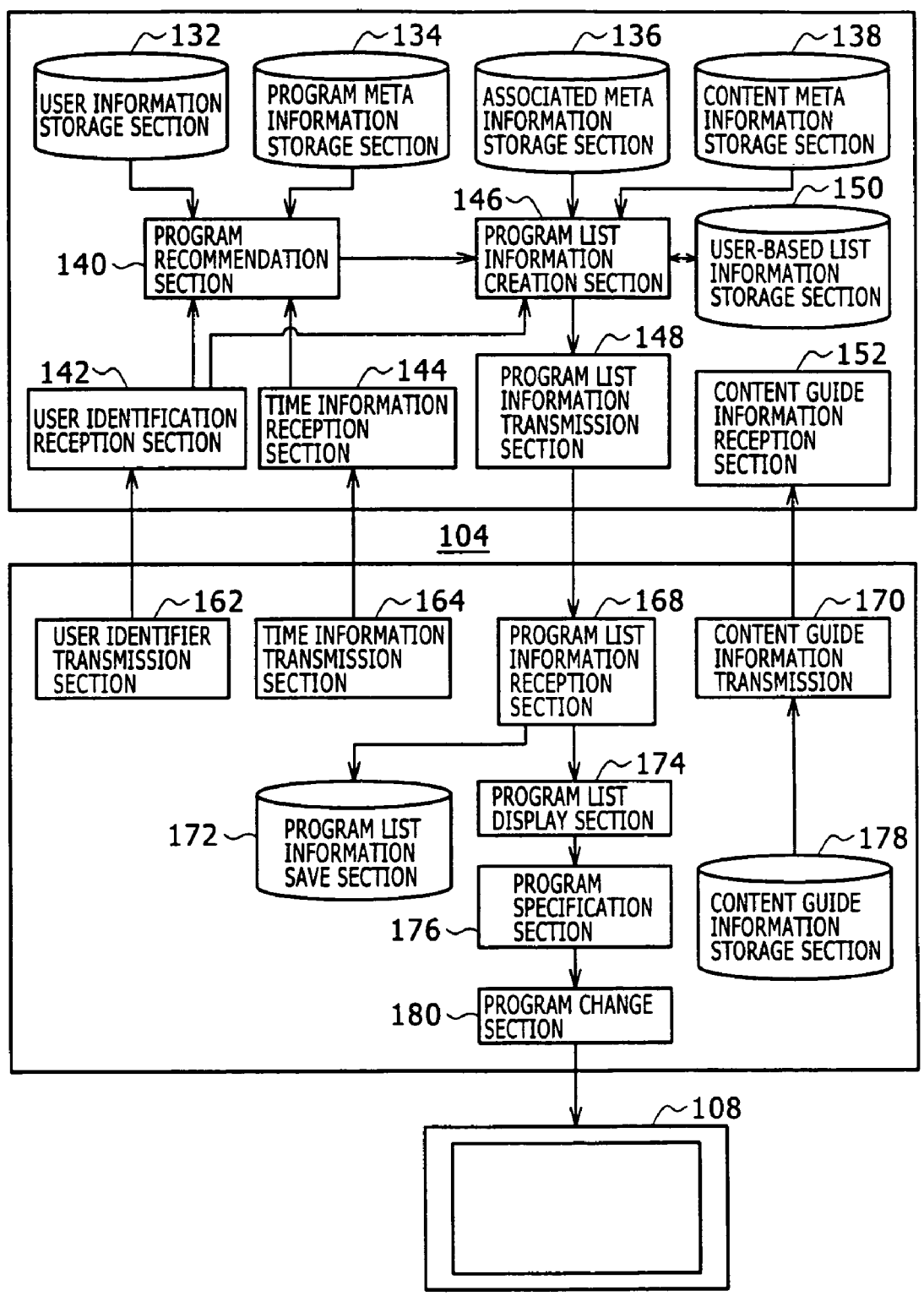
FIG. 3 is a block diagram showing the function configuration of a program information management server and a program information operation terminal according to the first embodiment of the present invention.

There has been described the hardware configuration of the program information operation terminal 104. With reference to FIG. 3, the following describes the function configuration of the program information management server 102 and the program information operation terminal 104.

For example, the program information management server 102 has a user information storage section 132, a program meta information storage section 134, an associated meta information storage section 136, a contents meta information storage section 138, a program recommendation section 140, a user identification reception section 142, a time information reception section 144, a program list information creation section 146, a program list information transmission section 148, a user-based list information storage section 150, and a content guide information reception section 152.

The user information storage section 132 stores a user identifier and user's preference information associated with each other. The user identifier uniquely identifies a user who uses the program information processing system 100 according to the embodiment. For example, the user's preference information includes a result from questionnaires about program genres and performers preferred by users and an audience log of programs watched by users. The user's preference information can be stored in the program information management server 102 via the program information operation terminal 104. The audience log can provide information such as a genre of programs often watched by the user or performers appearing on the programs. Such information may be extracted as the user's preference information.

The user information storage section 132 may store the user's audience area information and the user identifier associated with each other. The user's audience area information concerns an area where the user watches programs. Specifically, the user's audience area information provides information about the user's residence or the area predetermined by the user. Depending on areas, programs broadcast in the same time slot may or may not be available to users. For example, the same time slot may contain different programs and channels for the ground wave broadcast depending on whether the audience area belongs to a key station or a local station or depending on areas to which the local station belongs. To solve this problem, a user is allowed to store an area for the user to watch programs as the audience area information. In this manner, the user's audience area information can be added to a retrieval condition when the program recommendation section 140 (to be described) retrieves a program recommended to the user from the program meta information storage section 134. As a result, the retrieval result can contain only programs available to the user's audience area.

The program meta information storage section 134 stores meta information about programs. As mentioned above, the program meta information contains at least information about the time at which the program can be provided to users. Specifically, for example, the time to start broadcasting the program content and a period to broadcast it can be used to represent the time at which the program becomes available to users. The program meta information further includes, for example, channel information about the channel to broadcast the program, program name information, program genre information, cast information, script writer information, and keyword information to characterize the program content.

The program meta information may further include information about the area where the program is broadcast. When the program meta information includes the broadcast area information, the program recommendation section 140 (to be described) can compare the user's audience area information with the broadcast area information included in the program meta information. In this manner, it is possible to retrieve programs that are broadcast in the user's audience area and are available to the user. Alternatively, the program information management server 102 may have an additional storage section that associates the area information with information such as programs broadcast in the area. When a local station is assumed for a key station, for example, the storage section stores each prefecture and a broadcast channel for the local station in the prefecture associated with each other. According to the above-mentioned configuration, the program recommendation section 140 first obtains a broadcast channel associated with the area based on the area information associated with the user identifier. The program recommendation section 140 can then use the broadcast channel as a retrieval condition and retrieve programs to be broadcast on the broadcast channel in the user's audience area from the program meta information storage section 134.

The associated meta information storage section 136 stores associated meta information. The associated meta information associates program meta information stored in the program meta information storage section 134 with content meta information stored in a content meta information storage section 138. For example, the associated meta information storage section 136 stores an identifier for uniquely identifying program meta information from the program meta information storage section 134 and an identifier for uniquely identifying content meta information from the content meta information storage section 138 associated with each other. Since the associated meta information is used to associate the program meta information with the content meta information, the association can be easily changed. It just needs to update only the associated meta information without changing the program meta information or the content meta information.

The content meta information storage section 138 stores meta information about contents. For example, the contents include Web sites selling products related to the program and Web sites providing the most recent information about performers appearing on the program. The content meta information provides meta information about such contents and includes the content's location information, type information (motion picture, still picture, and the like), and keyword information to characterize the content. The content meta information includes information about program-related CDs (Compact Disks) recording the program's theme song, program-related DVDs (Digital Versatile Disks) recording the previous broadcast contents in a serial program, program-related books such as the program's original, work, and the other program-related products such as tickets and game software.

The user identification reception section 142 receives a user identifier from the program information operation terminal 104. The time information reception section 144 receives time information from the program information operation terminal 104. The time information provides information about the time used as the reference for the list of programs a user wants to browse on the program information operation terminal 104'. For example, when the user wants to browse a list of currently broadcast programs, the time information provides the current time information on the program information operation terminal 104. When the user wants to browse a list of programs to be broadcast two hours after the current time, the time information provides the time two hours added to the current time on the program information operation terminal 104.

The user identification reception section 142 and the time information reception section 144 respectively receive the user identifier and the time information from the program information operation terminal 104. Based on the user identifier and the time information received in this manner, the program recommendation section 140 references the program meta information stored in the program meta information storage section 134 to retrieve a program that is available to users at the approximate time indicated by the time information and is recommendable for a user identified by the user identifier. The program available at the approximate time indicated by the time information signifies a program the user can watch at the time indicated by the time information. For example, such program includes a program to start broadcasting at the specified time and a program to start broadcasting approximately at the specified time and to be on the air at the time. Specifically, the approximate time signifies a range of time including the time to start broadcasting a program that is to be on the air at a specified time. For example, let us consider that a program to be on the air at a specified time started broadcasting one and a half hours before that specified time. The approximate time includes the time one and a half hours before the specified time to start broadcasting the program (i.e., the time when the program is available to users).

When the user information storage section 132 stores the audience area, the user's audience area information is also added to the retrieval condition as mentioned above. The program recommendation section 140 references the program meta information stored in the program meta information storage section 134 to retrieve a program that is available to users at the time indicated by the time information, can be watched in the user's audience area, and is recommendable for a user identified by the user identifier.

As mentioned above, the program meta information includes at least information about the time when the program is available to users. The program recommendation section 140 compares the time information with the received time information. In this manner, the program recommendation section 140 can retrieve a program available to users at the time indicated by the received time information, i.e., the program being broadcast. As mentioned above, the user information storage section 132 stores the user identifier and the user's preference information identified by the identifier. Based on the received user identifier, the program recommendation section retrieves the user's preference information from the user information storage section 132. Based on the retrieved preference information, the program recommendation section can retrieve a program having the program meta information suited for the preference information from the program meta information storage section 134. Further, the program recommendation section calculates the information indicating the order of recommended programs. For example, there are provided recommendation grades 100, 90, 80, and so on in the order of user preferences. These recommendation grades are assumed to be recommendation information and are supplied to the program list information creation section 146.

The program list information creation section 146 creates program list information supplied to the program information operation terminal 104. Specifically, the program list information creation section 146 first obtains a program identifier and the recommendation information about each program from the program recommendation section 140. The program identifier identifies a program to be included in the program list and recommended to the user. Based on the program identifier, the program list information creation section 146 obtains the program meta information such as program name information and channel information from the program meta information storage section 134 to create the program list information together with the recommendation information.

By creating the program list as mentioned above, it is possible to create the program list information containing the information only about the program that is broadcast at the time indicated by the time information received by the time information reception section 144 and is recommended for the user identified by the user identifier received by the user identification reception section 142. Further, the program list information can contain information about programs not recommended. In such case, for example, it is desirable to provide flags so as to be able to distinguish recommended programs from those not. Inclusion of the recommendation information in the program list information makes it possible to distinguish recommended programs with high recommendation ranks from those with low recommendation ranks.

The program list information creation section 146 references the associated meta information storage section 136. In this manner, the program list information creation section 146 obtains the content meta information associated with the program meta information to be included in the program list from the content meta information storage section 138. The program list information can also include the content meta information. Inclusion of the content meta information in the program list makes it possible to provide the user with not only the information about the program recommended for the user, but also the information about the contents related to the program.

There may be a case where the program list information creation section 146 uses the program list information to include the program meta information and the content meta information. In this case, it may be preferable to vary the amount of program meta information or content meta information based on each program's recommendation grade. Concerning the program with a high recommendation grade and a high recommendation rank, for example, the program list information can contain more program meta information or content meta information so as to provide the user more information. Concerning the program with a low recommendation grade and a low recommendation rank, on the contrary, the program list information can contain only the minimum program meta information and exclude the content meta information. According to such configuration, the program list information contains only information estimated to be profitable for users. It is possible to create the program list information profitable for users despite a small amount of information.

Figure 4:
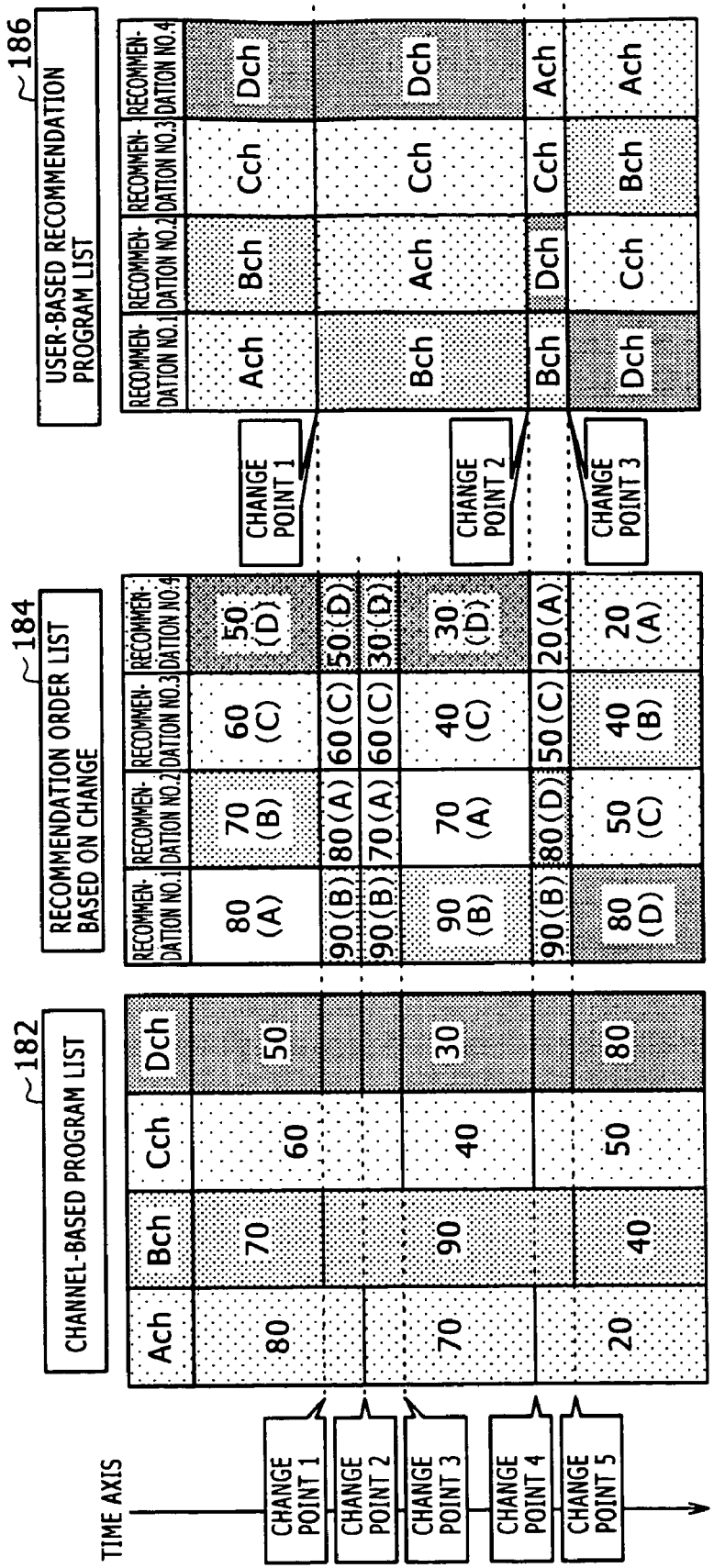
FIG. 4 is a explanatory diagram showing a process of creating use-based program lists according to the first embodiment of the present invention.

The user-based list information storage section 150 stores the user-based program list information created by the program list information creation section 146. Each time the user identifier and the time information are received from the program information operation terminal 104, the program recommendation section 140 may retrieve programs recommended for the user. Based on the retrieval result, the program list information creation section 146 may create the program list information. Further, a process speed can be improved by creating program list information for a specified time period and storing it in the user-based list information storage section 150. When the user identifier and the time information are received from the program information operation terminal 104 in this case, the precreated program list information just needs to be read from the user-based list information storage section 150. The program list information creation section 146 may create the program list information for 24 hours in the middle of the night when it is supposed to be a little chance of providing the program list information to the program information operation terminal 104, for example. Referring now to FIG. 4, the following describes a process of creating the program list information stored in the user-based list information storage section 150.

A channel-based program list 182 provides a list of programs broadcast on each channel in a given time slot. The program recommendation section 140 calculates recommendation grades for the respective programs. The calculated recommendation grades are represented by numbers (80, 70, 60, and so on). A recommendation order list based on change points 184 provides a list of programs broadcast at the same time sorted by recommendation rank. Broadcast periods depend on programs. Let us suppose that a program with recommendation grade 80 is broadcast on channel A and, in the meantime, a program with recommendation grade 70 on channel B terminates, and then a program with recommendation grade 90 begins. In this case, the recommendation ranks change even though the program broadcast on channel A is unchanged. The recommendation order list based on change points 184 provides a list of programs sorted by recommendation rank based on change points. A user-based recommendation program list 186 provides a list of channels sorted by recommendation rank. These recommendation program lists are created for each user. When receiving a user identifier and the time information from the program information operation terminal, the program list information creation section 146 retrieves data of the time indicated by the time information from the list created for the user. In this manner, it is possible to obtain the program list information sorted by recommendation.

Returning now back to FIG. 3, the description about the program information management server 102 will be continued. The program list information transmission section 148 has a function to supply the program information operation terminal 104 with the program list information created by the program list information creation section 146. The content guide information reception section 152 has a function to receive the content guide information (to be described) from the program information operation terminal 104.

The function configuration of the program information operation terminal 104 will now be described. For example, the program information operation terminal 104 has a user identifier transmission section 162, a time information transmission section 164, a program list information reception section 168, a content guide information transmission section 170, a program list information save section 172, a program list display section 174, a program specification section 176, a content guide information storage section 178, and a program change section 180.

The user identifier transmission section 162 transmits a user identifier to the program information management server 102. The time information transmission section 164 transmits the time information to the program information management server 102. The time information transmission section 164 may obtain the current time from the program information operation terminal 104 and transmit the current time as the time information. Alternatively, the time information transmission section 164 may transmit the user-specified time as the time information. The program list information reception section 168 has a function to receive the program list information from the program information management server 102 and supply it to the program list display section 174. The program list information reception section 168 also has a function to store the received program list information in the program list information save section 172.

The program list display section 174 has a function to display the program list on a display apparatus 116 provided for the program information operation terminal 104 based on the program list information obtained from the program list information reception section 168 or the program list information read from the program list information save section 172. The program list display section 174 displays the program meta information and the content meta information based on the recommendation information contained in the program list information in the order of recommendations. According to such configuration, the display apparatus displays the information about programs recommended for the user in accordance with the user's preference in the order of recommendations. The user can easily and fast find interested programs. Display examples of the program list will be described later with reference to FIG. 6.

The program list information save section 172 saves the program list information. Since the program list information is saved in the program list information save section 172, the program list information for several hours can be received from the program information management server 102 and saved. Thereafter, the program list display section 174 can display the program list at a specified time by reading the program list information at that time from the program list information save section 172. There is no need to re-receive the program list information from the program information management server 102. Consequently, it is possible to decrease the number of communications with the program information management server 102 and improve the process speed.

The program specification section 176 has a function to specify one program from the program list displayed by the program list display section 174 on the display apparatus 116. For example, the program specification section 176 obtains an identifier to identify a program specified by the user from the program list using the input apparatus 118. Further, the program specification section 176 provides the program change section 180 with the obtained program's identifier and stores the identifier in the content guide information storage section 178.

The program change section 180 has a function to communicate with the program output apparatus 108 and command the program output apparatus 108 to output the contents of a program specified by the program specification section 176.

The content guide information storage section 108 has a function to store the content guide information. The content guide information is used to guide users to the content associated with the content meta information contained in the program list information. Specifically, the content guide information includes such content meta information as the content's location information and the program's identifier. When the content's location information is used as the content guide information, the content guide information transmission section 170 transmits the content's location information to the program information management server 102. In this manner, the program information operation terminal 104 can obtain the content indicated by the location information via the program information management server 102. When the program's identifier is used as the content guide information, the identifier is transmitted to the program information management server 102. In this manner, the program information management server 102 can obtain the program meta information associated with the program identified by the identifier. The program information management server 102 can use the associated meta information to obtain the content meta information associated with the program meta information. The program information management server 102 can provide the program information operation terminal 104 with the content indicated by the content meta information. Accordingly, the use of the program's identifier as the content guide information makes it possible to obtain contents associated with the program at a time.

The program information operation terminal 104 can use a related content reception section (not shown) to receive the content associated with the above-mentioned program from the program information management server 102. The program information operation terminal 104 can use an associated content display section (not shown) to display the received content on the display apparatus 116. The content guide information stored in the content guide information storage section 108 may be copied to the other information processors. In this manner, an information processor other than the program information operation terminal 104 can be used to obtain and browse contents guided by the content guide information.

Figure 5A:
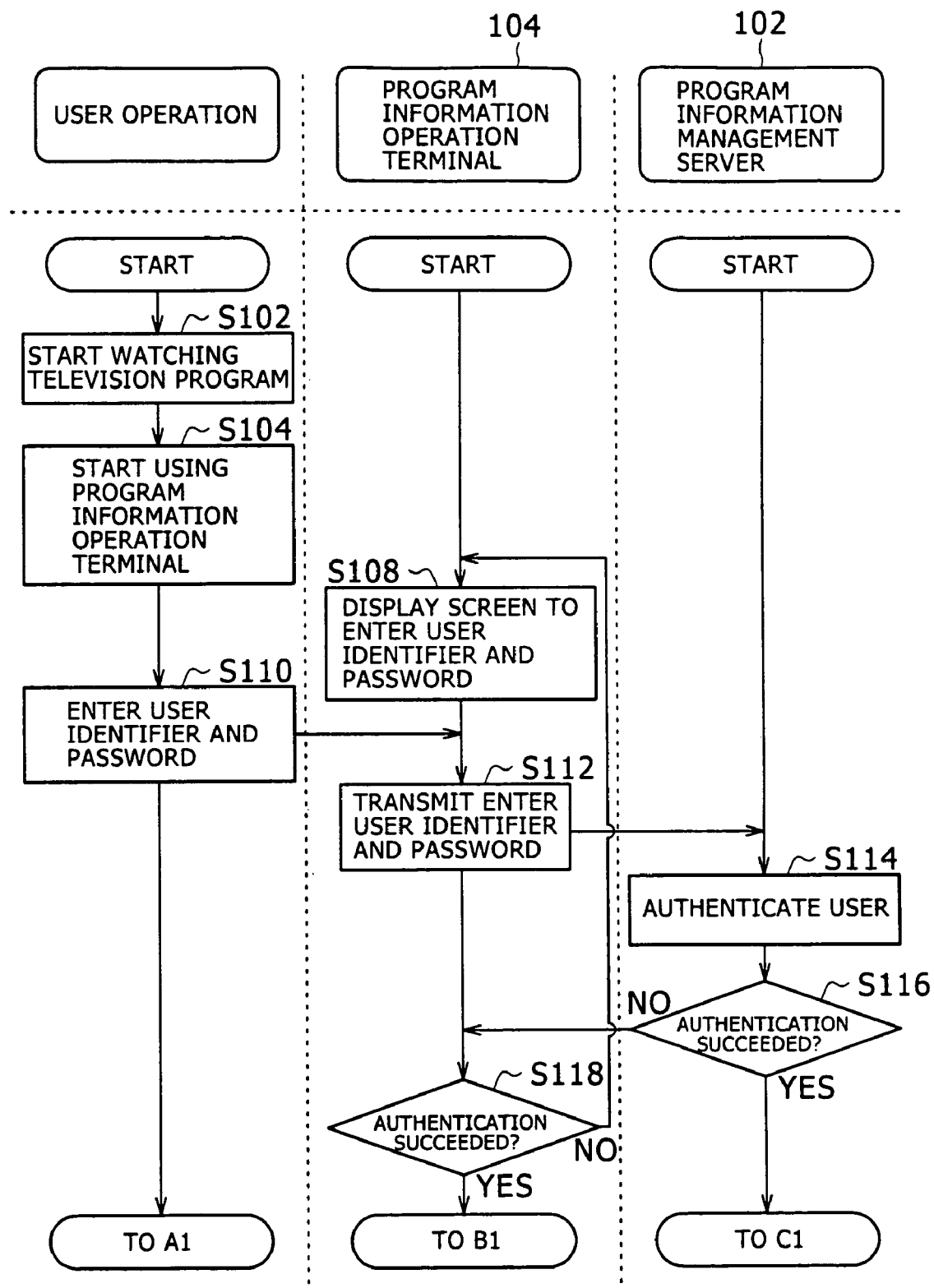
FIG. 5A is a timing chart showing the program information process according to the first embodiment of the present invention.
Figure 5B:
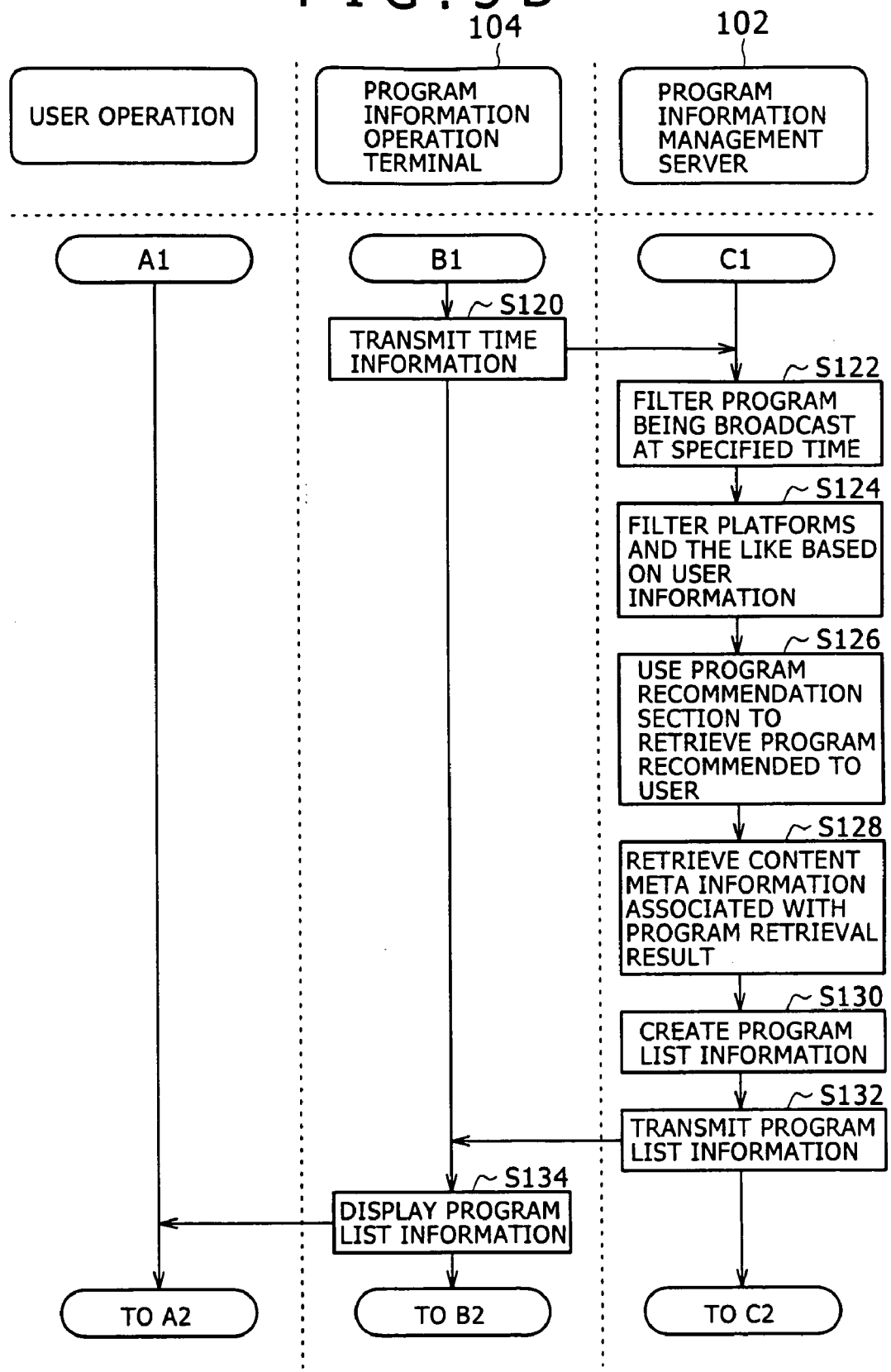
FIG. 5B is a timing chart showing the program information process according to the first embodiment of the present invention.
Figure 5C:
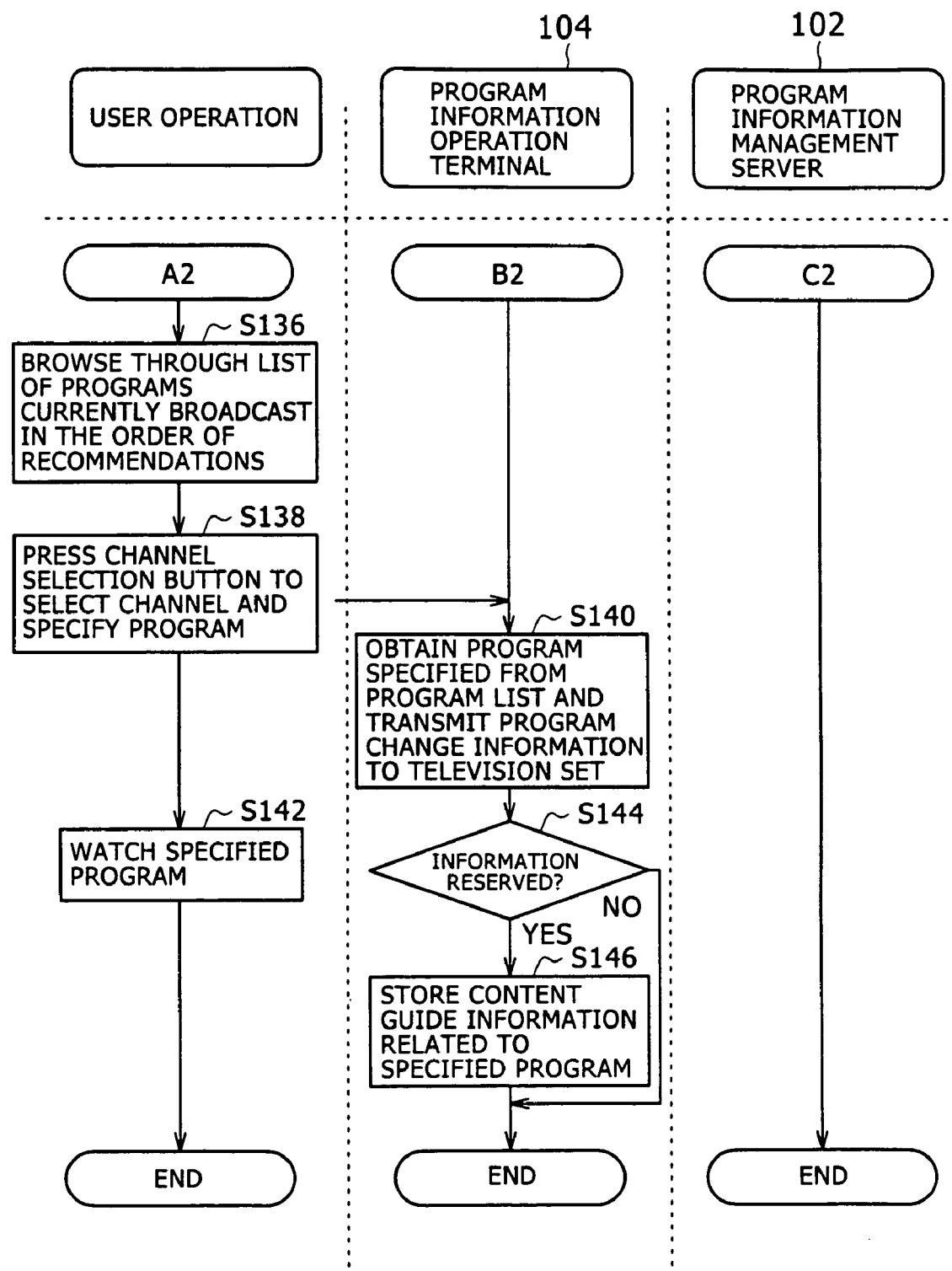
FIG. 5C is a timing chart showing the program information process according to the first embodiment of the present invention.

There have been described the function configurations of the program information management server 102 and the program information operation terminal 104. Referring now to FIGS. 5A through 5C, the following describes process flows of program information in the program information processing system 100.

At step S102, a user starts watching the television (S102) to start the use of the program information operation terminal 104 (S104). The program information operation terminal 104 first displays a screen to enter a user identifier and a password (S108). When the user enters the user identifier and the password (S110), the program information operation terminal 104 transmits the entered user identifier and password to the program information management server 102 (S112).

The program information management server 102 receives the user identifier and the password and references the user information storage section 132 to authenticate the user (S114). When the authentication fails due to the invalid user identifier or password (S116), the program information management server 102 returns this condition to the program information operation terminal 104. When the authentication fails (S118), the program information operation terminal 104 re-displays the screen for entering the user identifier and the password to prompt the user for reentry.

When the program information management server 102 succeeds in the user authentication at step S116, the process proceeds to step S120. At step S120, the program information operation terminal 104 transmits the time information to the program information management server 102 (S120 in FIG. 5B). When receiving the time information, the program information management server 102 first references the program meta information storage section 134 to filter programs to be broadcast at the time indicated by the received time information (S122). The program information management server 102 then references the user information storage section 132. When the user information storage section 132 stores platform information (ground wave, BS, CS, and the like) associated with the user identifier, the program information management server 102 further filters the programs based on the platform information (S124). When the user information storage section 132 stores the user's audience area information, the program information management server 102 further filters the programs based on the user's audience area information.

The program recommendation section 140 retrieves a program recommended according to the user's preference out of the filtered programs (S126). The program list information creation section 146 obtains the program meta information and the content meta information associated with the program as the retrieval result (S128) and creates the program list information (S130). The program list information transmission section 148 transmits the created program list information to the program information operation terminal 104 (S132).

When receiving the program list information, the program information operation terminal 104 displays the program list on the display apparatus 116 (S134). Using such display, the user can browse through a list of programs currently broadcast or to be broadcast at the user-specified time in the order of recommendations (S136). To change an intended program, the user can press a channel selection button as an example of input means on the program information operation terminal 104. This makes it possible to select and specify an intended program from the program list displayed on the display apparatus 116 (S138).

The program information operation terminal 104 obtains the identifier of the user-specified program. The program information operation terminal 104 transmits program change information to a television set as an example of the program output apparatus 108 so as to change to the program identified by the identifier (S140). The program output apparatus 108 receives the program change information and outputs the specified program content. The user can watch the specified program (S142). At step S144, the program information operation terminal 104 allows the user to select whether or not to reserve the content information associated with the user-specified program (S144). When it is determined to reserve the content information, the program information operation terminal 104 stores the content guide information in the content guide information storage section 178 (S146).

There has been described the process flows of the program information in the program information processing system 100. Referring now to FIG. 6, the following describes display examples of program lists displayed on the display apparatus 116 for the program information operation terminal 104.

A program list display screen 202 displays a program list 210. As shown in FIG. 6, the program list 210 is displayed in the order of recommendations for the user and also contains the corresponding recommendation grades. When the user selects an intended program from the program list 210 and selects a "Detail" button using the input apparatus 118, for example, the display apparatus 116 displays a program detail information display screen 204. The program detail information display screen 204 displays detailed information 212 about the specified program based on the program meta information contained in the program list information.

When the user presses an "Associated information" button on the program detail information display screen 204 using the input apparatus 118, for example, the display apparatus 116 displays an associated information list screen 206. The associated information list screen 206 displays an associated information list 214 for the specified program based on the content meta information contained in the program list information.

When the user selects the "Detail" button on the associated information list screen 206 using the input apparatus 118, for example, the display apparatus 116 displays an associated information detail screen 208. The associated information detail screen 208 displays a content 216 obtained from the program information management server 102 based on the content guide information.

Figure 7:
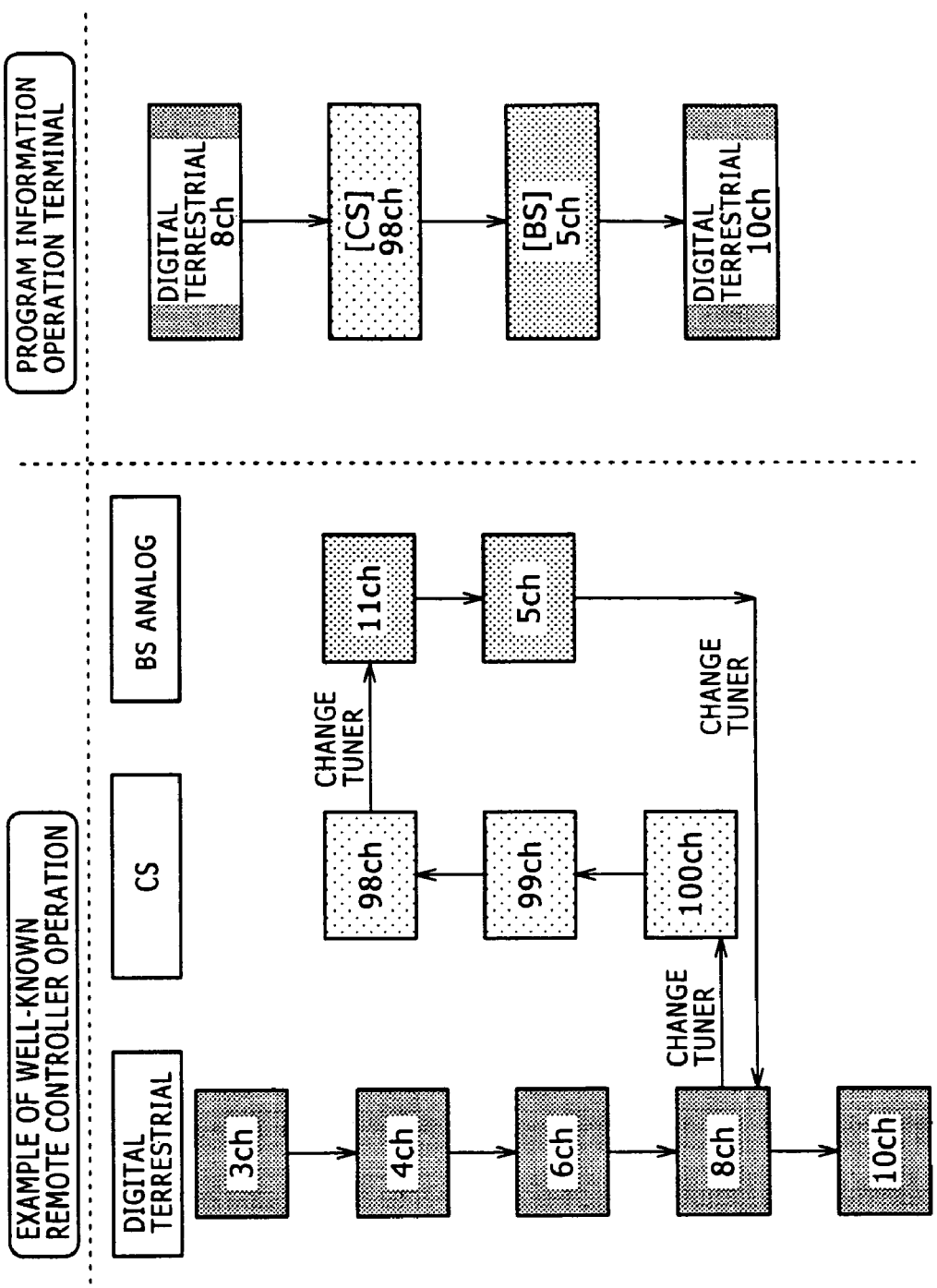
FIG. 7 is an explanatory diagram showing program selection operations according to the first embodiment and a well-known technique.

There have bee described the display examples of program lists displayed on the display apparatus 116 for the program information operation terminal 104. Referring now to FIG. 7, the following describes user's channel change operations to change program contents (channels) supplied from the program output apparatus 108 using the program information operation terminal 104 according to the embodiment compared to user's channel change operations to change channels using a well-known television set's remote controller.

When using a well-known remote controller, a user operates Up and Down buttons to sequentially change channels until finding an interested program. To change platforms, the user performs a tuner change operation. On the selected platform, the user sequentially changes channels to find an interested program. Using the well-known remote controller, the user needs to repeatedly change channels until finding an interested program.

On the other hand, the program information operation terminal 104 allows the display apparatus 116 to sequentially display channels broadcasting programs supposed to interest the user in the order of recommendations for the user. The user can find an interested program through a few operation steps.

There has been described the program information processing system 100 according to the first embodiment. When viewing the broadcast program table on a portable terminal such as a cellular phone, it is difficult to obtain or display much information at a time. It has been a common practice to repeatedly obtain information and change displays until finding an intended program. The program information processing system 100 according to the above-mentioned configuration can solve this problem. This is because the program information operation terminal 104 can obtain the program list containing, by preference, programs recommended to the user according to his or her preference and display the program list in the order of recommendations.

In the program information processing system 100 according to the first embodiment, the program recommendation section 140 retrieves programs recommended based on the user's preference information from the program meta information storage section 134. The retrieved programs are used to create the program list according to the user's preference. As a modification of the first embodiment, the system can also be configured to create the program list in the order of priorities supplied to the programs by the user. For example, the user uses the program information operation terminal 104 or the other information processors to browse through a Web site or a broadcast program table concerning programs to be broadcast at an intended time and prioritize the programs. The program information management server 102 stores the program-based priorities associated with the user identifier. The program information management server 102 later creates the program list information based on the stored priorities and transmits it to the user's program information operation terminal 104. Such configuration enables the user to browse through the program list on the program information operation terminal 104 according to the priorities specified by the user. The program information management server 102 may create the program list information by combining recommendations according to the user's preference in the first embodiment and user-specified priorities in the above-mentioned modification. In this case, the user can use the program list to browse through the programs prioritized by the user in the order of priorities and unprioritized programs in the order of recommendations.

Second Embodiment

A second embodiment of the present invention will now be described by applying the program information processing system to a program information processing system 300 that retrieves programs using the program meta information. The program information processing system 300 has a program information management server 302 to store the program meta information as meta information about programs and a program information operation terminal 304 to specify retrieval conditions.

The program information processing system 300 will be outlined below. In the program information processing system 300, a user uses the program information operation terminal 304 to retrieve programs. Specifically, the user uses the program information operation terminal 304 to supply the program information management server 302 with the time scheduled to broadcast a user's intended program in the past or in the future and a keyword for retrieval. Based on the specified time and keyword, the program information management server 302 retrieves the program meta information stored in it. The program information management server 302 returns a program having the program meta information matching the time and the keyword as a retrieval result to the user. The retrieval result may contain a plurality of programs. In this case, the user specifies retrieval keywords and the program information management server 302 retrieves the program meta information until the user can specify an intended one of the programs or the retrieval result contains one specified program.

When the user freely specifies a retrieval keyword, the specified keyword may not be contained in the program meta information stored in the program information management server 302. In this case, the retrieval result shows nothing, making it difficult to perform the efficient retrieval. To solve this problem, the program information management server 302 according to the embodiment supplies the user with keywords extracted for the next retrieval from the program meta information associated with each of a plurality of programs in the retrieval result. The user can choose from the supplied keywords, making the efficient and proper retrieval available.

For example, there may be a case where the user happened to watch a program in the past time slot and wants to retrieve it, but cannot specify a proper retrieval keyword because of a poor memory. Even in this case, since the keywords are supplied, the user can use them to keep track of his or her memory about the program. As a result, this increases the possibility to find the intended program.

There has been described the overview of the program information processing system 300. The following describes the configuration of the program information processing system 300.

The overall configuration of the program information processing system 300 is almost the same as that of the program information processing system 100 according to the first embodiment and a description is omitted. The hardware configuration of the program information operation terminal 304 is almost the same as that of the program information operation terminal 104 and a description is omitted.

Figure 8:
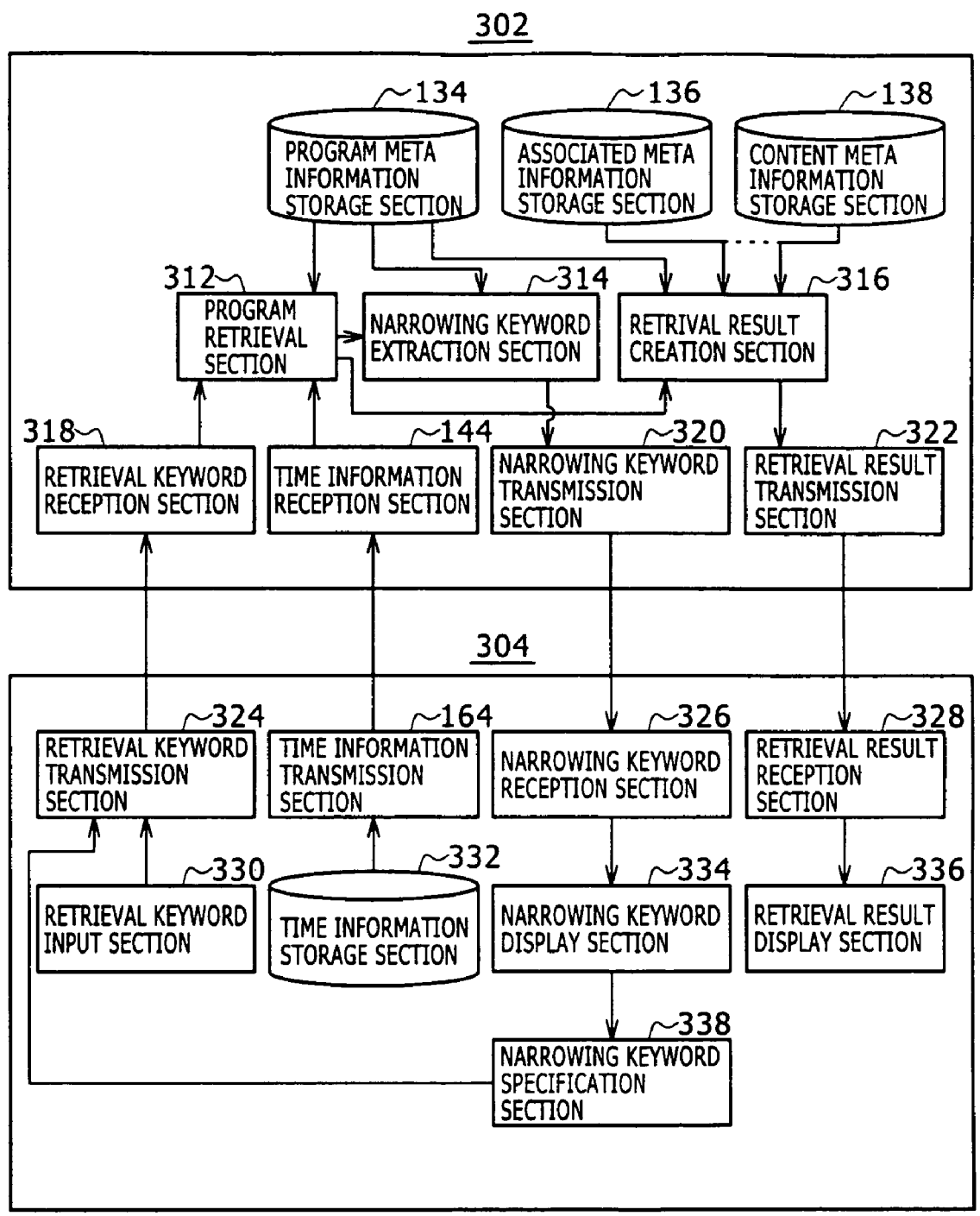
FIG. 8 is a block diagram showing the function configuration of a program information management server and a program information operation terminal according to a second embodiment of the present invention.

Referring now to FIG. 8, the following describes the function configuration of the program information management server 302 and the program information operation terminal 304.

For example, the program information management server 302 has a program meta information storage section 134, an associated meta information storage section 136, a content meta information storage section 138, a program retrieval section 312, a narrowing keyword extraction section 314, a retrieval result creation section 316, a retrieval keyword reception section 318, a time information reception section 144, a narrowing keyword transmission section 320, and a retrieval result transmission section 322.

The program meta information storage section 134, the associated meta information storage section 136, the content meta information storage section 138, and the time information reception section 144 have almost the same functions as those of the program information management server 102 according to the first embodiment and a description is omitted.

The retrieval keyword reception section 318 has a function to receive retrieval keywords from the program information operation terminal 304. Retrieval keywords may be specified by a user or may be supplied from narrowing keywords to be described. The time information reception section 144 receives time information from the program information operation terminal 304. The time information provides the time scheduled to broadcast a user's intended program in the past or in the future.

The program retrieval section 312 obtains a retrieval keyword from the retrieval keyword reception section 318 and the time information from the time information reception section 144. Based on the retrieval keyword and the time information, the program retrieval section 312 retrieves the program meta information stored in the program meta information storage section 134. Specifically, the program retrieval section 312 retrieves programs broadcast at the specified time. The program meta information contains at least information about the time when the program is available to the user. The program retrieval section 312 compares the information about the time with the time information obtained from the time information reception section 144. In this manner, the program retrieval section 312 can retrieve programs on the air, i.e., programs available to the user at the time indicated by the received time information.

Thereafter, the program retrieval section 312 further retrieves programs matching the retrieval keywords. That is, the program retrieval section 312 retrieves programs containing the retrieval keywords from a plurality of program meta information associated with programs retrieved based on the time information. The program retrieval section 312 generates a retrieval result of programs associated with the program meta information containing the retrieval keywords.

When the retrieval result specifies one program, the program retrieval section 312 provides the program's identifier to the retrieval result creation section 316. When the retrieval result specifies a plurality of programs, the program retrieval section 312 provides the program's identifier to the retrieval result creation section 316 and the narrowing keyword extraction section 314.

The retrieval result creation section 316 creates a retrieval result based on the program's identifier obtained from the program retrieval section 312. Specifically, to create a retrieval result, the retrieval result creation section 316 obtains the program meta information containing the program's identifier from the program meta information storage section 134 and properly extracts the program name information, the cast information, and the like. The retrieval result may contain the content meta information associated with the program. The content meta information can be obtained from the content meta information storage section 138 by referencing the associated meta information in the associated meta information storage section 136. The created retrieval result is transmitted to the program information operation terminal 304 via the retrieval result transmission section 322.

The narrowing keyword extraction section 314 obtains the program's identifier from the program retrieval section 312 and, based on the identifier, extracts narrowing keywords for retrieval from the program meta information. Specifically, the narrowing keyword extraction section 314 obtains the program meta information containing the program's identifier from the program meta information storage section 134. The narrowing keyword extraction section 314 extracts the program genre information, the cast information, and the keyword information characterizing the program content from the program meta information. When the retrieval result shows a plurality of retrieval results, the program retrieval section 312 provides the program's identifier to the narrowing keyword extraction section 314. Accordingly, the narrowing keyword extraction section 314 obtains identifiers for a plurality of programs. The narrowing keyword extraction section 314 extracts the narrowing keywords as mentioned above for all the identifiers. The narrowing keyword extraction section 314 obtains the narrowing keywords for the programs from the program meta information storage section 134. Thereafter, the extracted narrowing keywords are transmitted to the program information operation terminal 304 via the narrowing keyword transmission section 320.

The following describes the function configuration of the program information operation terminal 304. For example, the program information operation terminal 304 has a retrieval keyword transmission section 324, a time information transmission section 164, a narrowing keyword reception section 326, a retrieval result reception section 328, a retrieval keyword input section 330, a time information storage section 332, a narrowing keyword display section 334, a retrieval result display section 336, and a narrowing keyword specification section 338.

The retrieval keyword transmission section 324 transmits the following to the program information management server 302: a keyword supplied to the retrieval keyword input section 330 for program retrieval and a narrowing keyword selected by the narrowing keyword specification section 338 from a plurality of narrowing keywords. The retrieval keyword input section 330 provides the retrieval keyword transmission section 324 with a retrieval keyword entered by a user using the input apparatus 118 provided for the program information operation terminal 304.

The time information transmission section 164 transmits information about the time scheduled to broadcast an intended program in the past or in the future. The time information transmission section 164 may transmit information about the time specified by the user using the input apparatus 118 or may read and transmit the time information stored in the time information storage section 332.

The time information storage section 332 stores the time information as mentioned above. The time information storage section 332 may store information about the time explicitly specified by a user using the input apparatus 118. Alternatively, the time information storage section 332 may store information about the time when a specified operation is performed triggered by another specified operation performed by the user on the input apparatus 118, for example. It is convenient for the user to be able to store information about the time to perform a specified operation. When the user happened to watch a program, for example, simply performing the specified operation allows the time information storage section 332 to store information about the time when the user happened to watch the program. The user can retrieve that watched program based on the stored time information.

The narrowing keyword reception section 326 receives narrowing keywords from the program information management server 302 and provides them to the narrowing keyword display section 334. The narrowing keyword display section 334 displays narrowing keywords obtained from the narrowing keyword reception section 326 on the display apparatus 116 provided for the program information operation terminal 304. Display examples of the narrowing keywords will be described later with reference to FIGS. 9 and 10.

The narrowing keyword specification section 338 obtains a narrowing keyword specified by the user using the input apparatus 118 out of narrowing keywords displayed by the narrowing keyword display section 334 on the display apparatus 116. The narrowing keyword specification section 338 provides the obtained narrowing keyword to the retrieval keyword transmission section 324.

The retrieval result reception section 328 obtains information about the program as a retrieval result from the program information management server 302 and provides the information to the retrieval result display section 336. The retrieval result display section 336 allows the display apparatus 116 to display the obtained information about the program as the retrieval result. A display example of the retrieval result will be described later with reference to FIG. 9.

Figure 9:
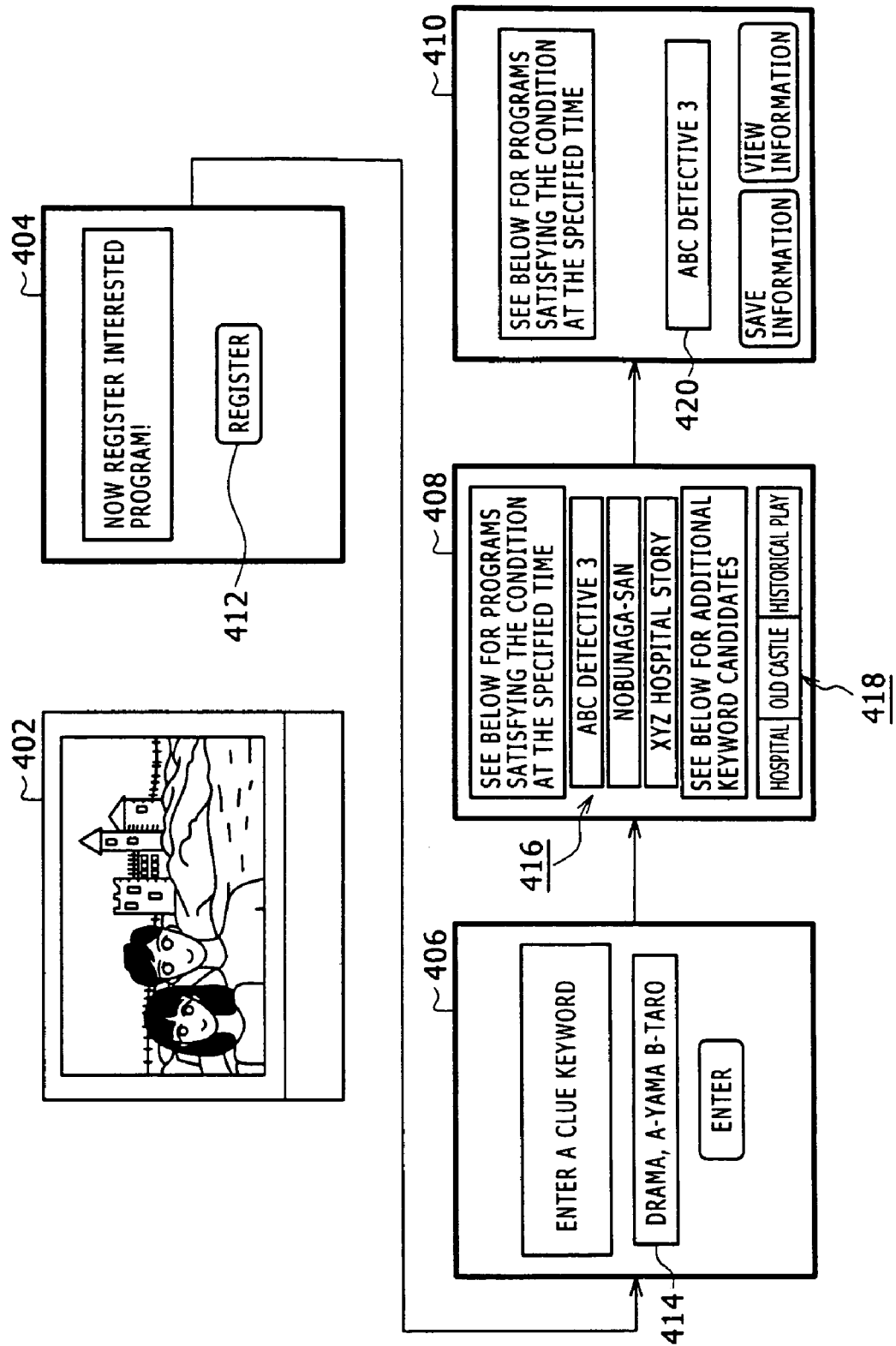
FIG. 9 is an explanatory diagram showing screen layouts displayed on the program information operation terminal according to the second embodiment of the present invention.
Figure 10:
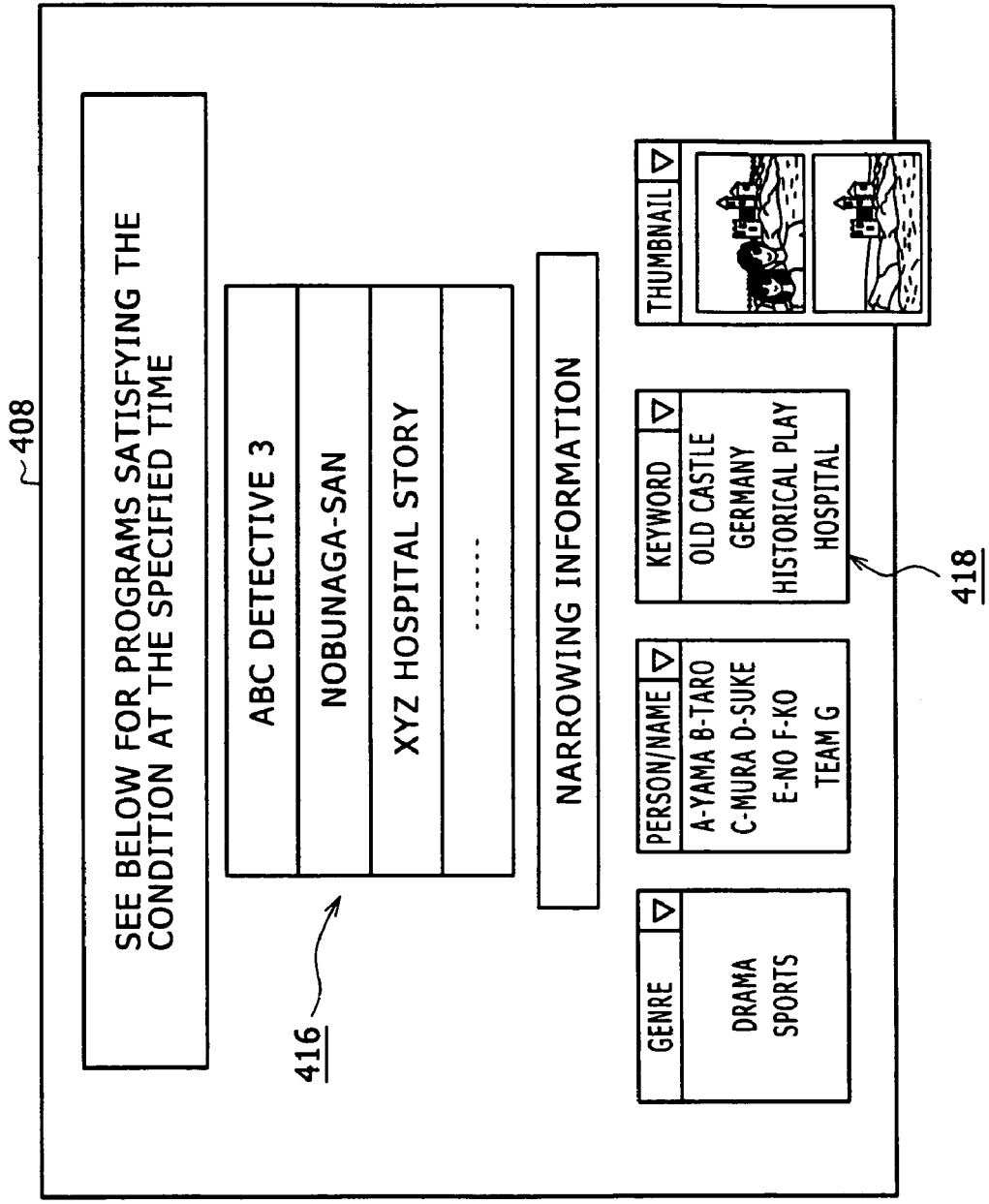
FIG. 10 is an explanatory diagram showing a screen layout displayed on the program information operation terminal according to the second embodiment of the present invention.

There have been described the function configurations of the program information management server 302 and the program information operation terminal 304. Referring now to FIGS. 9 and 10, the following describes display examples of narrowing keywords and retrieval results displayed on the display apparatus 116 on the program information operation terminal 304.

Let us suppose that a user of the program information processing system 300 happened to watch a program broadcast on a television set 402. To obtain information about that program later, the user presses a registration button 412 in a time registration screen on the program information operation terminal 304. When the registration button 412 is pressed, the program information operation terminal 304 stores the current time in the time information storage section 332.

The user then proceeds to a retrieval start screen 406 on the program information operation terminal 304, enters a keyword for retrieving an intended program in a keyword input area 414, and then presses an input button. The program information operation terminal 304 transmits the entered retrieval keyword and the time information read from the time information storage section 332 to the program information management server 302.

The program information operation terminal 304 then receives a retrieval result and narrowing keywords from the program information management server 302 and displays a narrowing keyword selection screen 408. The narrowing keyword selection screen 408 displays program name information 416 as the retrieval result and narrowing keywords 418. When the user specifies a narrowing keyword, a retrieval result screen 410 appears. The retrieval result screen 410 displays retrieval result information 420 showing a program whose program meta information contains the specified narrowing keyword. Further, the retrieval result screen 410 may be configured so that the user presses a button for viewing the information to display information about a content associated with the program as the retrieval result.

FIG. 10 shows another display example of narrowing keywords. The program meta information is an object to extract narrowing keywords. In this example, the program meta information is classified into groups such as a genre, a name, a keyword, and a thumbnail. In this case, narrowing keywords can also be displayed for each group as shown in FIG. 10.

Figure 11:
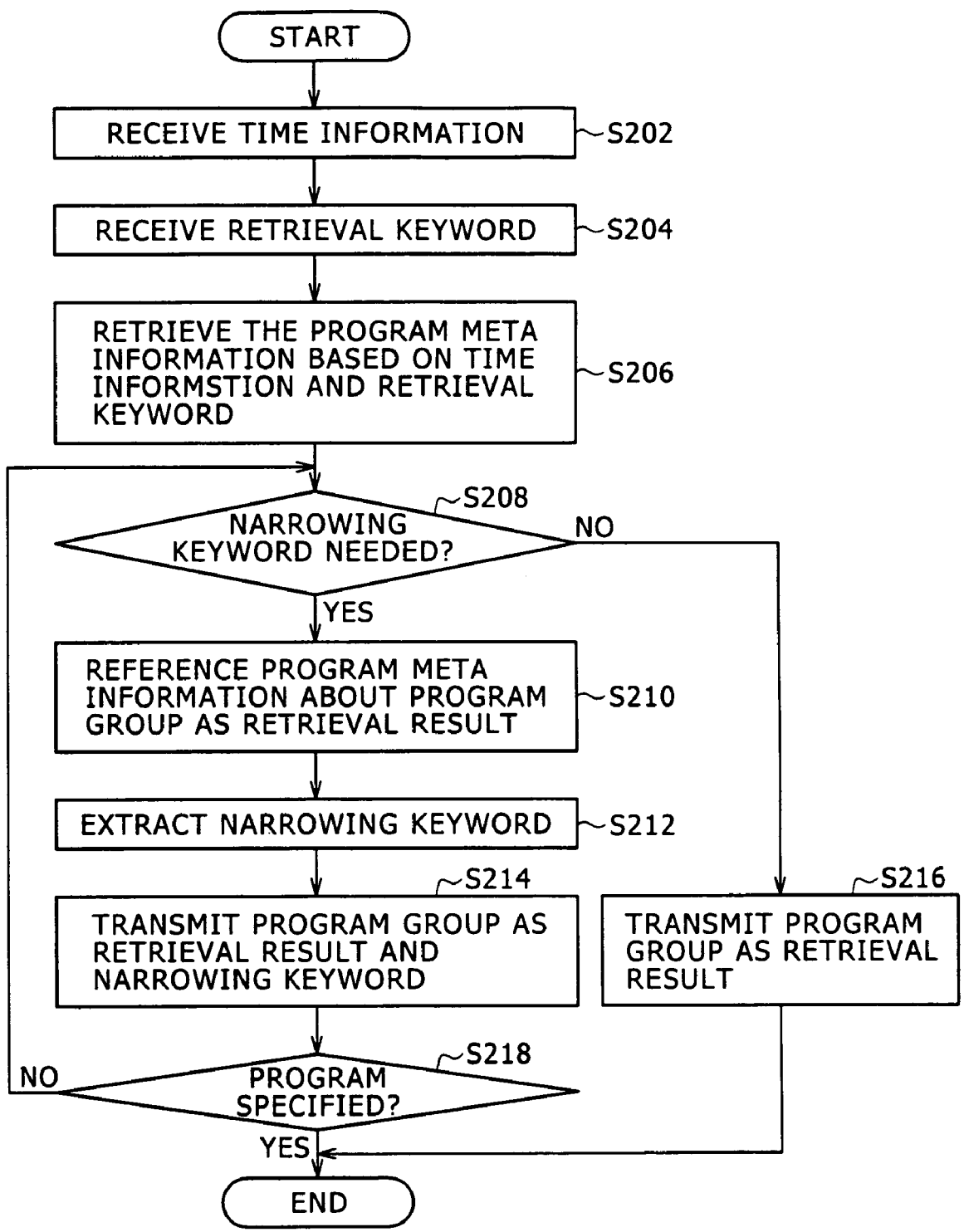
FIG. 11 is a flowchart showing a program information process according to the second embodiment of the present invention.

There have been described the display examples of narrowing keywords and the retrieval result. Referring now to FIGS. 11 and 12, the following describes flowcharts showing a program retrieval process performed by the program information management server 302.

At step S202, the program information management server 302 receives the time information from the program information operation terminal 304 (S202) and then receives a retrieval keyword (S204). Based on the received time information and retrieval keyword, the program information management server 302 retrieves the program meta information stored in the program meta information storage section 134 (S206). Referring now to FIG. 12, the following specifically describes the retrieval process performed by the program information management server 302.

FIG. 12 shows an example of the program meta information stored in the program meta information storage section 134. The program retrieval section 312 of the program information management server 302 retrieves programs being broadcast at the time indicated by the specified time information by comparing time information 434 contained in the program meta information with the time information obtained from the program information operation terminal 304. As shown in FIG. 12, for example, the time information 434 contains a broadcast start time (Published Time) and a broadcast period (Published Duration).

After the retrieval according to the time information, the program retrieval section 312 uses the retrieval keyword obtained from the program information operation terminal 304 to retrieve the corresponding retrieval keyword or a similar keyword from the program meta information. After the retrieval according to the retrieval keyword, the program retrieval section 312 extracts narrowing keywords from the program meta information. As shown in FIG. 12, the program retrieval section 312 appropriately extracts narrowing keywords such as keyword information 436 and 438, and cast information 440 contained in the program meta information.

Returning now back to FIG. 11, the description about the retrieval process flow will be continued. At step S206, the program information management server 302 retrieves the program meta information to obtain a retrieval result. There may be a case where there is a plurality of retrieval results and a narrowing keyword is necessary (S208). In this case, the program information management server 302 references the program meta information for each of the programs in the retrieval result (s210) to extract a narrowing keyword (S212). The program information management server 302 then transmits the programs in the retrieval result and the narrowing keyword to the program information operation terminal 304 (S214). At step S208, there may be a case where the retrieval result specifies one program and needs no narrowing keyword. In this case, the program information management server 302 transmits the information about the program in the retrieval result to the program information operation terminal 304 (S216). In this manner, the program information management server 302 terminates the retrieval process.

When the user's intended program can be specified from the programs in the retrieval result (s218), the program information management server terminates the retrieval process. When the user's intended program is not specified, the program information management server re-extracts a narrowing keyword.

Figure 13:
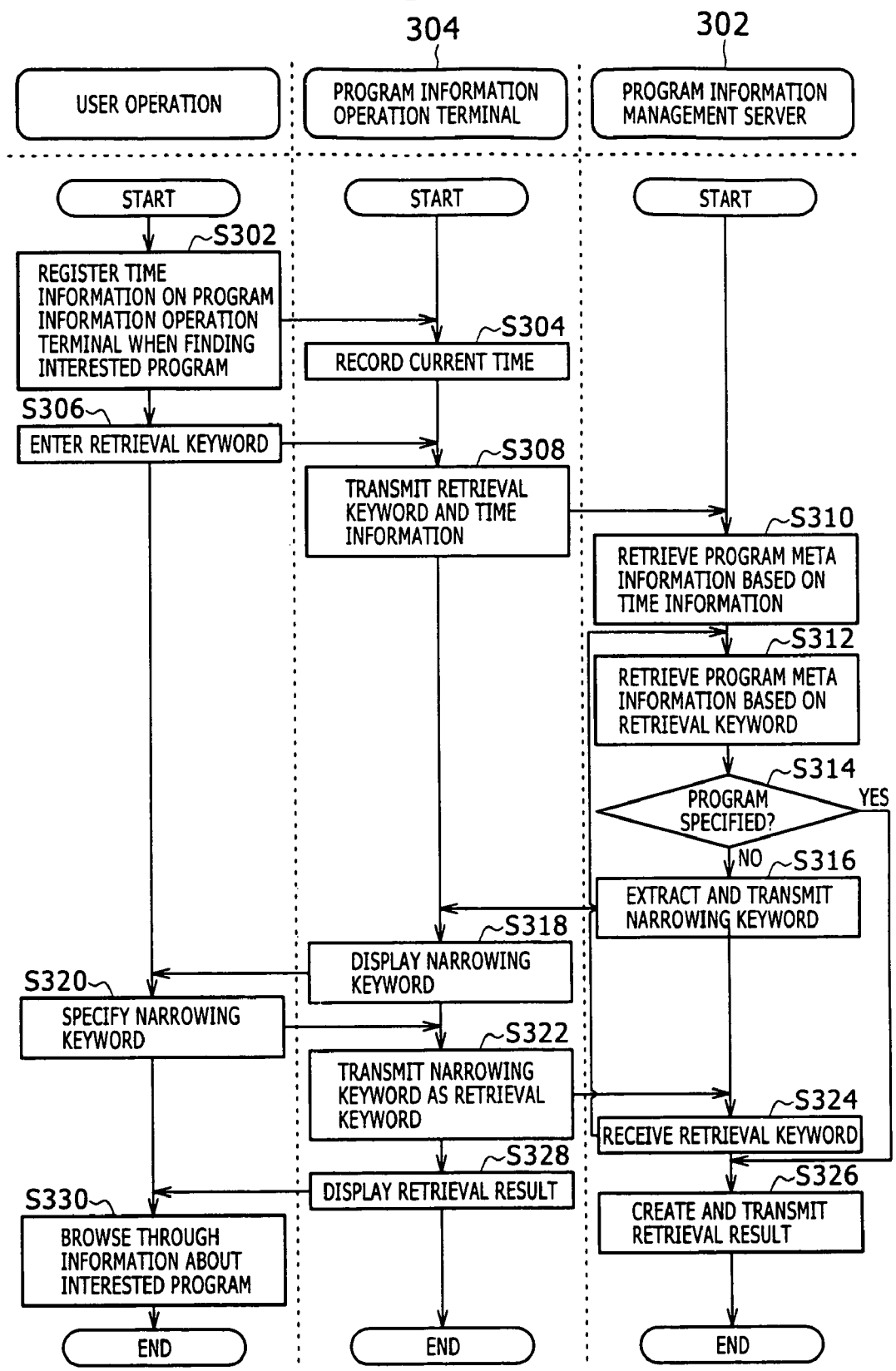
FIG. 13 is a timing chart showing a program information process according to the second embodiment of the present invention.

There has been described the flow of the program retrieval process performed by the program information management server 302. Referring now to FIG. 13, the following describes a program information process flow in the program information processing system 300.

Let us suppose that a user of the program information processing system 300 happened to watch a program and may need to acquire information about it. The user registers the time information on the program information operation terminal 304 (S302). The program information operation terminal 304 records the current time in the time information storage section 332 (S304). The user inputs a given retrieval keyword to the program information operation terminal 304 (S306). The program information operation terminal 304 transmits the input retrieval keyword and the time information stored in the time information storage section 332 to the program information management server 302 (S308).

The program information management server 302 retrieves the program meta information based on the received time information (S310). The program information management server 302 further retrieves the program meta information based on the retrieval keyword (S312). A retrieval result may specify one program (S314). In this case, the program information management server 302 transmits information about the program in the retrieval result to the program information operation terminal 304 (S326). The program information operation terminal 304 displays the received retrieval result (S328). In this manner, the user can browse through the information about the intended program (S330).

At step S314, on the other hand, there may be a plurality of retrieval results, making it difficult to specify one program. The program information management server 302 extracts narrowing keywords from the program meta information associated with the programs as the retrieval results and transmits them to the program information operation terminal 304 (S316). The program information operation terminal 304 displays the received narrowing keywords (S318) and prompts the user to specify a narrowing keyword.

The user specifies one of narrowing keywords displayed on the program information operation terminal 304 (S320). The program information operation terminal 304 assumes the specified narrowing keyword to be a retrieval keyword and transmits it to the program information management server 302 (S322). The program information management server 302 receives the retrieval keyword (S324) and then returns to step S312 to repeat the retrieval based on a retrieval keyword. When the specified narrowing keyword can specify one program, the program information management server 302 transmits the retrieval result to the program information operation terminal 304 without re-retrieving the program meta information.

Figure 14:
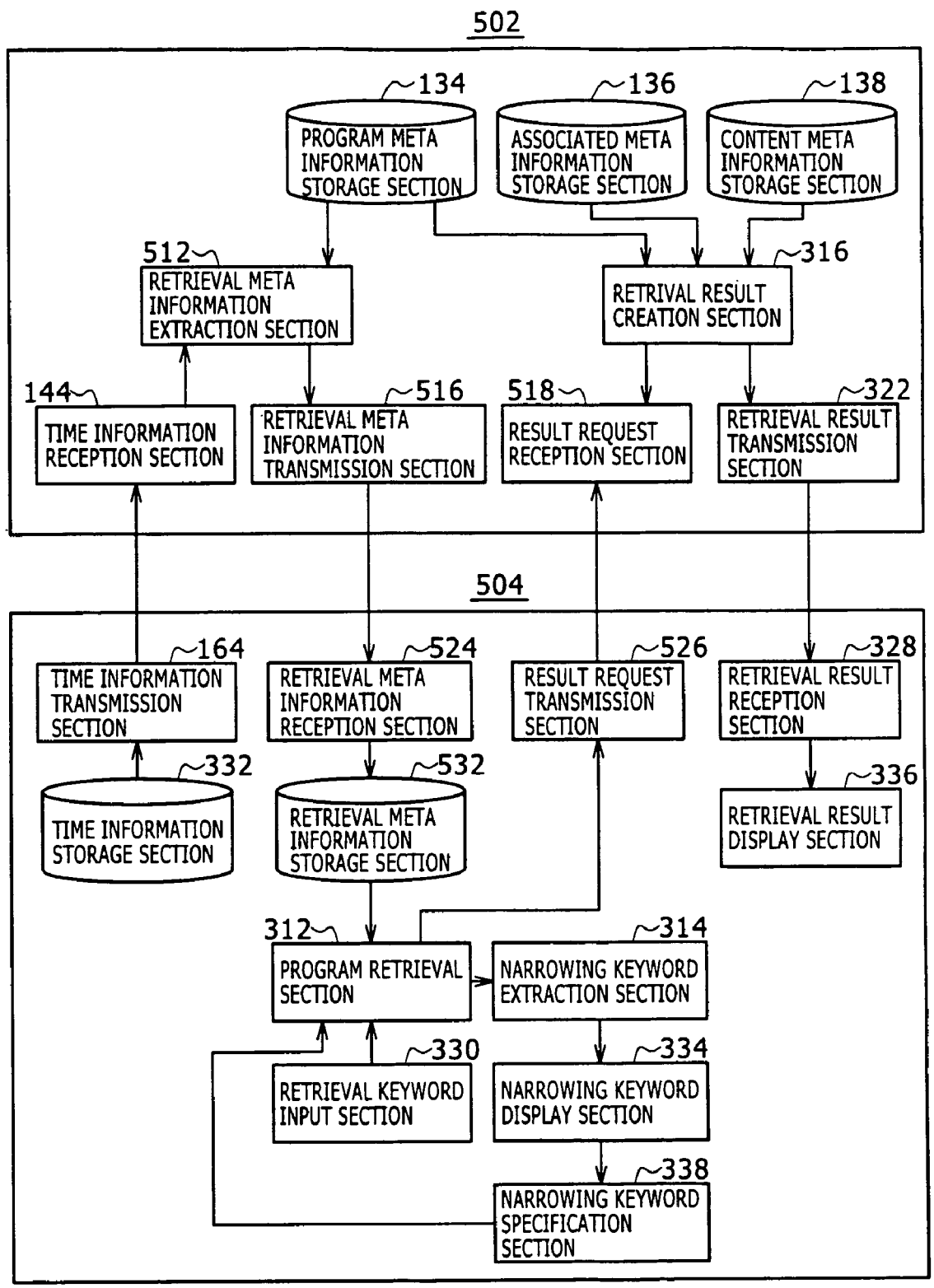
FIG. 14 is a block diagram showing the function configuration of the program information management server and the program information operation terminal according to a modification of the second embodiment of the present invention.

There has been described the program information process flow in the program information processing system 300. The program information processing system 300 according to the second embodiment is configured so that the program information management server 302 extracts narrowing keywords. Further, the program information processing system 300 may be configured so that the program information operation terminal 304 extracts narrowing keywords. With reference to FIGS. 14 and 15, the following describes a modification of the second embodiment showing the configuration where the program information operation terminal 304 extracts narrowing keywords.

FIG. 14 shows the function configurations of a program information management server 502 and a program information operation terminal 504 for the configuration where the program information operation terminal extracts narrowing keywords. The same parts or components in the program information management server 302 and the program information operation terminal 304 are depicted by the same reference numerals and a detailed description is omitted for simplicity. The following describes differences.

A retrieval meta information extraction section 512 of the program information management server 502 uses time information obtained from the time information reception section 144 and retrieves the program meta information to obtain all programs on the air at the time indicated by the time information. The retrieval meta information extraction section 512 extracts all program meta information associated with the respective programs from the program meta information storage section 134. A retrieval meta information transmission section 516 obtains the program meta information from the retrieval meta information extraction section 512 and transmits it to the program information operation terminal 504. According to this configuration, the program information operation terminal 504 can collectively obtain the program meta information about programs on the air at the specified time. Based on the obtained program meta information, the program information operation terminal 504 can perform the retrieval process and the narrowing keyword extraction process.

A result request reception section 518 receives a retrieval result transmission request from the program information operation terminal 504 and provides it to the retrieval result creation section 316. For example, when receiving a program identifier as a retrieval result transmission request, the retrieval result creation section 316 creates the retrieval result based on the identifier by referencing the program meta information storage section 134, the associated meta information storage section 136, and the content meta information storage section 138. The retrieval result transmission section 322 can transmit the intended retrieval result to the program information operation terminal 504.

A retrieval meta information reception section 524 of the program information operation terminal 504 receives the program list information from the program information management server 502 and stores it in a retrieval meta information storage section 532. Based on the retrieval keyword, the program retrieval section 312 retrieves the corresponding program from the retrieval meta information storage section 532. Based on the retrieval result from the program retrieval section 312, the narrowing keyword extraction section 314 extracts narrowing keywords from the retrieval meta information storage section 532. The narrowing keyword display section 334, the narrowing keyword specification section 338, and the retrieval keyword input section 330 function as mentioned above. A result request transmission section 526 transmits a retrieval result transmission request so as to obtain information about the program as a retrieval result from the program retrieval section 312.

There have been described the function configurations of the program information management server 502 and the program information operation terminal 504. Referring now to FIG. 15, the following describes program information process flows in the program information management server 502 and the program information operation terminal 504.

Let us suppose that a user happened to watch a program and may need to acquire information about it. The user registers the time information on the program information operation terminal 504 (S402). The program information operation terminal 504 records the current time in the time information storage section 332 (S404). Later on, the user starts retrieving the intended program (S406). The program information operation terminal 504 reads the time information stored in the time information storage section 332 and transmits the time information to the program information management server 502 (S408).

Based on the received time information, the program information management server 502 extracts the program meta information from the program meta information storage section 134 and transmits it to the program information operation terminal 504 (S410). The program information operation terminal 504 stores the received program meta information in the retrieval meta information storage section 532 (S412).

Later on, the user inputs a retrieval keyword (S414). Based on the input retrieval keyword, the program information operation terminal 504 retrieves the program meta information stored in the retrieval meta information storage section 532 (S416). A retrieval result may specify one program (S418). To obtain information about the program, the program information operation terminal 504 transmits a result request to the program information management server 502. The program information management server 502 receives the result request (S426), creates a retrieval result based on the result request, and transmits it to the program information operation terminal 504 (S428). Receiving the retrieval result, the program information operation terminal 504 displays the retrieval result (S430). In this manner, the user can browse through the information about the intended program (S432).

At step S418, on the other hand, the retrieval result may provide a plurality of programs. In this case, the program information operation terminal 504 extracts narrowing keywords from the program meta information stored in the retrieval meta information storage section 532 and displays them (S420). The user specifies one of narrowing keywords (S422). The program information operation terminal 504 assumes the specified narrowing keyword to be a retrieval keyword (S424). The program information operation terminal 504 then returns to step S416 to repeat the program meta information retrieval.

There has been described the program information processing system 300 according to the second embodiment including the modifications.

The present invention can be applied to a program information processing system, particularly to a program information processing system for processing information incidental on programs broadcast on television sets, radios, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A program information processing system, comprising:
   a program information management server configured to store program meta information as meta information about a program; and
   a program information operation terminal configured to allow a display apparatus to display a program list created based on said program meta information, wherein,
   said program information management server has,
   a program meta information storage section configured to store a plurality of said program meta information associated with a plurality of programs, wherein said program meta information includes at least available time information showing an availability of said program to a user;
   a user information storage section configured to store a user identifier associated with preference information of the user, wherein said user identifier uniquely identifies the user of said program information operation terminal;
   a user identification reception section configured to receive said user identifier from said program information operation terminal;
   a time information reception section configured to receive time information from said program information operation terminal;
   a program recommendation section configured to retrieve a plurality of programs from said program meta information storage section, wherein said retrieved programs are broadcast at an approximate time indicated by said time information based on said time information, said user identifier, and preference information stored in said user information storage section associated with said user identifier and are recommended to a user identified by said user identifier;
   a program list information creation section configured to create program list information based on program list information associated with each of the plurality of programs retrieved by said program recommendation section; and
   a program list information transmission section configured to transmit said program list information created by said program list information creation section to the program information operation terminal of the user identified by said user identifier; and
   said program information operation terminal has,
   a user identifier transmission section configured to transmit said user identifier to said program information management server;
   a time information transmission section configured to transmit said time information to said program information management server;
   a program list information reception section configured to receive said program list information from said program information management server; and
   a program list display section configured to allow said display apparatus to display said program list based on said program list information.

2. A program information management server which can be connected to a program information operation terminal for displaying a list of programs on a display apparatus via a communication network, said program information management server being configured to store program meta information as meta information about said programs, said program information management server comprising:

a program meta information storage section configured to store said program meta information at least including available time information including at least available time information showing an availability of said programs to a user;

a user information storage section configured to store a user identifier associated with preference information of said user, wherein said user identifier uniquely identifies said user of said program information operation terminal;

a user identification reception section configured to receive said user identifier from said program information operation terminal;

a time information reception section configured to receive time information from said program information operation terminal;

a program recommendation section configured to retrieve said programs from said program meta information storage section, wherein said retrieved programs are broadcast at an approximate time indicated by said time information based on said time information, said user identifier, and said preference information stored in said user information storage section associated with said user identifier and are recommended to a user identified by said user identifier;

a program list information creation section configured to create program list information based on program list information associated with each of said programs retrieved by said program recommendation section; and a program list information transmission section configured to transmit said program list information created by said program list information creation section to said program information operation terminal of said user identified by said user identifier.

3. The program information management server according to claim 2, further comprising:

a content meta information storage section configured to store content meta information as meta information about a content related to one of said programs in association with the one of said programs, wherein said program list information creation section is configured to include said content meta information in said program list information.

4. The program information management server according to claim 3, wherein said program recommendation section is configured to calculate information indicating a recommendation order of said programs; and wherein said program list information creation section is configured to determine an amount of said program meta information about at least one of said programs and said content meta information to be included in said program list information in accordance with said recommendation order of said programs.

5. A program information operation terminal which can be connected to a program information management server for storing program meta information as meta information about programs, said program information operation terminal being configured to allow a display apparatus to display a program list created based on said program meta information, said program information operation terminal comprising:

a user identifier transmission section configured to transmit a user identifier to said program information management server, wherein said user identifier uniquely identifies a user of said program information operation terminal;

a time information transmission section configured to transmit time information to said program information management server;

a program list information reception section configured to receive program list information from said program information management server, wherein said program list information is created based on said user identifier and said time information transmitted;

a program list display section configured to allow said display apparatus to display said program list based on said program list information;

a program specification section configured to connect with a program output apparatus for outputting program contents via a communication network, the program specification section being configured to specify a specific program out of said program list displayed on said display apparatus by said program list display section; and a program change section configured to transmit program change information to said program output apparatus so as to allow said program output apparatus to output a program content of a program specified by said program specification section, wherein, said program list contains, by preference, said programs which are broadcast at an approximate time indicated by said time information and are recommended to said user identified by said user identifier.

6. The program information operation terminal according to claim 5, wherein, said program list information contains recommendation information indicating a recommendation order of said programs; and said program list display section is configured to allow said display apparatus to display said program list according to said recommendation order provided for said user based on said recommendation information.

7. The program information operation terminal according to claim 5, further comprising: a content guide information storage section configured to store content guide information about a program selected from said program list, said program list including the content guide information for guidance to a content related to said program.

8. The program information operation terminal according to claim 5, comprising:

a content guide information transmission section configured to transmit content guide information to said program information management server, wherein said program list information includes said content guide information for guidance to a content related to one of said programs;

a related content reception section configured to receive a content guided by said content guide information from said program information management server; and a related content display section configured to display said related content on said display apparatus.

9. A computer readable storage medium including a computer program, the computer program allowing a computer to perform a method as a program information management server which can be connected to a program information operation terminal for displaying a list of programs on a display apparatus via a communication network, when the computer executes the computer program, said program information management server being configured to store program meta information as meta information about programs, said method comprising:

storing said program meta information at least including available time information including at least available time information showing an availability of said programs to a user;

storing a user identifier associated with preference information of said user, wherein said user identifier uniquely identifies said user of said program information operation terminal;

receiving said user identifier from said program information operation terminal;

receiving time information from said program information operation terminal;

retrieving, with the computer, said programs, wherein said retrieved programs are broadcast at an approximate time indicated by said time information based on said time information, said user identifier, and said preference information associated with said user identifier and are recommended to a user identified by said user identifier;

creating program list information based on program list information associated with each of said programs retrieved in the retrieving; and transmitting said program list information created in the creating to said program information operation terminal of said user identified by said user identifier.

10. A computer-readable storage medium including a computer program, the computer program allowing a computer to perform a method as a program information operation terminal which can be connected to a program information management server for storing program meta information as meta information about programs, when the computer executes the computer program, the program information operation terminal being configured to allow a display apparatus to display a program list created based on said program meta information, said method comprising:

transmitting a user identifier to said program information management server, wherein said user identifier uniquely identifies a user of said program information operation terminal;

transmitting time information to said program information management server;

receiving, with the computer, program list information from said program information management server, wherein said program list information is created based on said user identifier and said time information transmitted; and allowing said display apparatus to display said program list based on said program list information, specifying a specific program out of said program list displayed on said display apparatus;

connecting with a program output apparatus for outputting program contents via a communication network; and transmitting, with the computer, program change information to said program output apparatus so as to allow said program output apparatus to output a program content of a program specified in the specifying, wherein, said program list contains, by preference, said programs which are broadcast at an approximate time indicated by said time information and are recommended to said user identified by said user identifier.

* * * * *